US007725914B2

(12) United States Patent
Kasai

(10) Patent No.: US 7,725,914 B2
(45) Date of Patent: May 25, 2010

(54) BROADCASTING METHOD, BROADCASTING SYSTEM AND CONTENTS ORGANIZING/SUPPLYING CENTER

(75) Inventor: Kazuhiko Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1266 days.

(21) Appl. No.: 10/129,802

(22) PCT Filed: Sep. 11, 2001

(86) PCT No.: PCT/JP01/07883

§ 371 (c)(1),
(2), (4) Date: Aug. 27, 2002

(87) PCT Pub. No.: WO02/23892

PCT Pub. Date: Mar. 21, 2002

(65) Prior Publication Data

US 2004/0130615 A1 Jul. 8, 2004

(30) Foreign Application Priority Data

Sep. 11, 2000 (JP) ............................ 2000-275070

(51) Int. Cl.
*H04N 7/173* (2006.01)
*H04N 7/10* (2006.01)

(52) U.S. Cl. ........................... 725/118; 725/35; 725/98; 725/116; 725/119

(58) Field of Classification Search ................... 725/48, 725/98, 116, 118, 119, 35, 36
See application file for complete search history.

(56) References Cited

U.S. PATENT DOCUMENTS

| | | | |
|---|---|---|---|
| 5,099,319 A | 3/1992 | Esch et al. | |
| 5,424,770 A | 6/1995 | Schmelzer et al. | |
| 5,499,046 A | 3/1996 | Schiller et al. | |
| 5,600,573 A * | 2/1997 | Hendricks et al. | 725/109 |

(Continued)

FOREIGN PATENT DOCUMENTS

| | | |
|---|---|---|
| EP | 0 482 801 | 4/1992 |

(Continued)

*Primary Examiner*—John W Miller
*Assistant Examiner*—John Schnurr
(74) *Attorney, Agent, or Firm*—Frommer Lawrence & Haug LLP; William S. Frommer; Ellen Marcie Emas

(57) ABSTRACT

A broadcasting system which permits broadcast of high dignity by rationalized equipment is provided. In this broadcasting station, the N-th affiliated station forwards program material data, CM material data and organization information data to a central station via an ATM/LAN, and registration means registers and stores such data into a program bank, a CM bank and a data server. Automatic sending control means and automatic sending means for the N-th affiliated station take out materials from the program bank, the CM bank or a CM bank for different J-th affiliated station, etc. under real time management of time management means on the basis of organization information registered and stored in the data server to organize televising contents to send out the televising contents to the N-th affiliated station via a dedicated digital line. Thus, the N-th affiliated station carries out broadcast of high dignity from transmitting means in the state where reorganization and processing of televising contents are not carried out, and cut and/or residual of unnecessary portion of televising contents taking place resulting from deviation in timing are excluded.

8 Claims, 18 Drawing Sheets

U.S. PATENT DOCUMENTS

| | | | | |
|---|---|---|---|---|
| 5,659,877 | A | 8/1997 | Enomoto et al. | |
| 5,666,645 | A * | 9/1997 | Thomas et al. | 725/47 |
| 6,314,571 | B1 * | 11/2001 | Ogawa et al. | 725/48 |
| 7,159,233 | B2 * | 1/2007 | Son et al. | 725/86 |
| 2004/0158853 | A1 * | 8/2004 | Doi et al. | 725/38 |
| 2005/0114906 | A1 * | 5/2005 | Hoarty et al. | 725/135 |

FOREIGN PATENT DOCUMENTS

| | | |
|---|---|---|
| EP | 0 497 449 | 8/1992 |
| JP | 10-65969 | 3/1998 |
| JP | 2000-78469 | 3/2000 |
| JP | 2000-83192 | 3/2000 |

* cited by examiner

ORGANIZATION INFORMATION FILE 2S

| BANK/FILE | START | END |
|---|---|---|
| Prg/PF101 | HOUR MIN. SEC. MILLISEC.<br>12 : 00 : 00 : 000 | 12 : 08 : 29 : 990 |
| CM/CF606 | 12 : 08 : 30 : 000 | 12 : 08 : 44 : 990 |
| Prg/PF225 | 12 : 08 : 45 : 000 | 12 : 19 : 59 : 990 |
| CM/CF059 | 12 : 20 : 00 : 000 | 12 : 00 : 14 : 990 |

If606

REPLACEMENT

If28

| | | |
|---|---|---|
| CM/CF606 | 12 : 08 : 30 : 000 | 12 : 08 : 44 : 990 |

FIG.10

| |
|---|
| 1-ST MODE : MATERIAL REGISTRATION/UPDATING MODE<br>· FORWARDING OF MATERIAL AND REGISTRATION/ UPDATING COMMAND FROM AFFILIATED STATION TO CENTRAL STATION Cbs<br>· RECEPTION BY CENTRAL STATION Cbs<br>· REGISTRATION/STORAGE OR UPDATING WITH RESPECT TO BANK BY CENTRAL STATION Cbs<br>· UPDATING OF LIST FILE WITHIN SERVER BY CENTRAL STATION Cbs |
| 2-ND MODE : REGISTERED INFORMATION REFERENCE MODE<br>· INSTRUCTION OF FORWARDING OF LIST WITHIN SERVER FROM AFFILIATED STATION TO CENTRAL STATION Cbs<br>· FORWARDING OF LIST FROM CENTRAL STATION Cbs TO AFFILIATED STATION<br>· RECEPTION AND EXAMINATION OF LIST BY AFFILIATED STATION<br>· INSTRUCTION OF FORWARDING OF MATERIAL (e.g. CM MATERIAL OF OTHER STATION) INDICATED IN LIST FROM AFFILIATED STATION TO CENTRAL STATION Cbs<br>· FORWARDING OF CORRESPONDING MATERIAL FROM CENTRAL STATION Cbs TO AFFILIATED STATION<br>· RECEPTION OF MATERIAL AND EXAMINATION OF ITS UTILIZATION BY AFFILIATED STATION |
| 3-RD MODE : ORGANIZATION INFORMATION REGISTRATION/ UPDATING MODE<br>· FORWARDING OF ORGANIZATION INFORMATION FROM AFFILIATED STATION TO CENTRAL STATION Cbs<br>· RECEPTION OF ORGANIZATION INFORMATION, AND REGISTRATION/STORAGE OR UPDATING WITH RESPECT TO ORGANIZATION INFORMATION BY CENTRAL STATION Cbs |
| 4-TH MODE : TELEVISING (ON AIR) MODE<br>· EXECUTION OF ORGANIZATION BASED ON TIME MANAGEMENT BY CENTRAL STATION Cbs, AND SENDING OF TELEVISING CONTENTS TO CORRESPONDING AFFILIATED STATION<br>· RECEPTION OF TELEVISING CONTENTS AND BROADCAST BY TRANSMITTING BY CORRESPONDING STATION |

FIG.12

BROADCASTING METHOD, BROADCASTING SYSTEM AND CONTENTS ORGANIZING/SUPPLYING CENTER

TECHNICAL FIELD

This invention relates to a broadcasting method, a broadcasting system and a contents organizing and supplying center.

BACKGROUND ART

In general broadcasting business, grouping is mainly carried out such that a broadcasting station existing at a large city is caused to be central station so-called key station and broadcasting stations existing in local areas are caused to be affiliated stations of the key station. The key station produces televising master which is common televising contents to send out it to respective affiliated stations. The respective affiliated stations receive the televising master to transmit it as televising contents to jurisdiction areas to thereby carry out televising (on air), or to organize a portion of the received televising master by using materials possessed in respective affiliated stations to change it into peculiar televising contents thereafter to carry out televising. In a manner as stated above, the so-called television program is delivered to the viewer side.

Respective broadcasting stations produce various programs or CM films irrespective of the key station and the affiliated station, and its process step begins from collection of materials by field collection using collection equipment, etc. Material is set of fragments of unedited image/sound, and is source material. Then, edit processing is implemented to the collected material by using editing mechanical equipment to cause it to be material (source). As the material, there are program source and CM source. In respective sources, there are HD (High Definition) form and SD (standard) form.

Respective broadcasting stations carry out organization (scheduling) of plural materials produced in this way so that they have predetermined order and time series. Such organized results are televised from respective stations as televising contents and television programs are thus formed or materialized. Accordingly, one television program is set in time divisional manner in which order of plural program sources and CM sources is caused to undergo time management.

Hitherto, collection of data, material collection, editing with respect to material and organization are carried out every broadcasting stations irrespective of the key station or the affiliated station. Materials are caused to undergo storage/management at banks prepared in respective broadcasting stations irrespective of the key station or the affiliated station, and are taken out from the banks in accordance with scheduling so that they are televised. Further, portions of televised respective sources are archived and are preserved for a long time.

FIG. 1 is a block diagram showing an example of equipment of a conventional broadcasting system. Moreover, FIG. 2 is a block diagram of an example of affiliated station in the conventional broadcasting system.

The conventional broadcasting system 100 comprises a key station 110, plural affiliated stations, e.g., affiliated station 120 shown, and a dedicated digital line 101 or a dedicated analog line 102 for connecting these stations. The key station 110 comprises an organization system 111 for organizing plural materials (program materials 115 and CM materials 116, etc. in the figure) so that they are caused to be one main contents 113, a marking unit 112 for driving or placing trigger signal 114 indicating timing between end of respective materials constituting the main contents 113 and start of the next material, and a sending equipment including an encoder 117, etc. for sending out the main contents 113 with trigger signal 114 to respective affiliated stations on the real time basis via the dedicated digital line 101 or the dedicated analog line 102. In addition, organization staffs, a marking manager and sending staffs are arranged.

Each affiliated station, e.g., affiliated station 120 comprises a production system 231 for editing collected materials to produce program materials (program sources) or CM materials (CM sources) peculiar to the own station, a program bank 126 for storing or archiving produced program materials, a CM bank 127 for storing or archiving produced CM materials, a data server 123 for storing or archiving organization information (scheduling information) peculiar to the own station obtained from an input system 124 for business information or organization information, a receiving equipment including a decoder 121, etc. for receiving main contents 113 sent from the key station 110, and an automatic sending control unit 122 for detecting the trigger signal 114 from flow of the received main contents 113 and for transmitting indication signal 122*a* which serves to suitably carry out replacement between program material 115 or CM material 116 in the main contents 113 and program material or CM material peculiar to the own station stored in the program bank 126 or the CM bank 127 on the basis of organization information 123*a* which has been taken out from the data server 123 to cause replaced one to be televising contents peculiar to the own station (source train which can be televised). Moreover, the automatic sending control unit 122 controls the operation of an automatic sending system 129.

The production system 231 has a function to not only produce program sources or CM sources peculiar to the own station as described above, but also receive program sources or CM sources which have been purchased from the external, e.g., other station, etc. as external input 131 to adjust the received sources. These materials are stored into the program bank 126 or the CM bank 127 after undergone adjustment, or are directly delivered to a distribution/routing unit 125 which will be described later as real time material.

The distribution/routing unit 125 carries out replacement between program material 115 and CM material 116 in the main contents 113 and real time material on the basis of indication signal 122*a* transmitted from the automatic sending control unit 122. Moreover, the distribution/routing unit 125 carries out replacement between program material 115 and CM material 116 in the main contents 113 and program material and CM material peculiar to the own station which have been taken out from the program bank 116 and the CM bank 127 to thereby cause the replaced one to be televising contents 128 peculiar to the own station.

The affiliated station 120 comprises such distribution/routing unit 125, the automatic sending system 129 operative under management by control of the automatic sending control unit 122 to send out televising contents 128, and a transmitting system 130 adapted to receive the televising contents sent from the automatic sending system 129 to carry out broadcast thereof from antenna. In addition, production staffs, bank managers, sending staffs and transmitting staffs are arranged.

Here, as shown in FIG. 2, at least two systems of the data server 123 for current use and a data server 223 for reserve are prepared as data server, at least two systems of the program bank 126 for current use and a program bank 226 for reserve are similarly provided as the program bank, and at least two systems of the CM bank 127 for current use and a CM bank 227 for reserve are provided as the CM bank. It is to be noted that, in this example, the case where "current" banks are ordinarily used is intentionally used.

Further, as the automatic sending control unit, at least two systems of the automatic sending unit 122 for current use and an automatic sending unit 222 for reserve are provided. Similarly, as the automatic send system, at least two systems of the automatic sending system 129 for current use and an automatic sending system 229 for reserve are provided. As the transmitting system, at least two systems of the transmitting system 130 for current use and a transmitting system 230 for reserve are provided.

Furthermore, a manual system 241 used at the time of emergency and a switching unit 242 for carrying out switching between the current unit and the preliminary unit are provided.

Accordingly, in the entirety of the conventional broadcasting system 100 composed of the key station 110 and plural affiliated stations 120 (e.g., N stations), there are installed (provided) data servers, program banks, CM banks, automatic sending control units, automatic sending systems and transmitting systems by at least 2N systems in such a manner that current systems and preliminary systems are included.

As the working content processed in each affiliated station, there are

1. Collecting step for collecting materials by field collection
2. Production step for editing original materials to cause the edited materials to be materials.
3. Storage/keeping step for storing/keeping material into bank
4. Organization step for carrying out scheduling of material
5. On air step for taking out material from bank under management of real time in accordance with schedule to televise it as televising contents
6. Archive step for archiving material As shown in FIG. 1, it is generally carried out to replace a portion of televising master in which main contents 113 prepared by the key station 110 and sent to the affiliated station 120, i.e., plural program materials (115, etc.) and CM materials (116, etc.) are sent out in order in time series manner in accordance with designated order by program material and/or CM material for replacement prepared at the affiliated station 120 to thereby organize televising contents 128 peculiar to corresponding affiliated station to carry out televising.

As stated above, in accordance with the conventional broadcasting system, in the case of carrying out switching between main contents 113 received at the time of televising at the affiliated station 120 and contents for replacement as occasion demands, the key station 110 stamps, e.g., net queue as trigger signal 114 on the main contents 113 to send out it. This trigger signal 114 serves to notify, to the affiliated station 120, timing in which, e.g., program material 115 ends and shift to CM material 116 succeeding to this program material 115 is carried out, and is stamped in a manner of anticipation by predetermined time determined in advance, e.g., 3 seconds by taking into consideration time required for switching processing at the affiliated station 120.

Accordingly, the automatic sending control unit 122 of the affiliated station 120 is operative so that when this unit 122 detects trigger signal 114 from received main contents 113, it carries out switching after 3 seconds from the trigger signal 114.

However, in the case where the above-described anticipation time changes owing to inconvenience taking place at transmission process via communication line of main contents (televising master) 113, e.g., line delay taking place at analog line, or jitter and/or wonder (fluctuation in point of time of arrival interval of packet produced by change of signal phase) taking place at digital line, there takes place deviation at switching timing for material replacement at the affiliated station 120.

Timing deviation at the time of transfer of packet taking place in the case where packet is transferred via digital line is shown in FIG. 3. When train of packet cm of the next material is sent successively to train of packet pkt of a certain material at the time of sending from the key station 110, trigger signal strg is marked or carved at the position anticipated by an anticipation time τs determined in advance. This anticipation time τs is sum of required time 501 for trigger signal detection processing required at the affiliated station 120, required time 503 of switching processing for material replacement and margin 502 of margin insurance, and is set to, e.g. 3 seconds.

Accordingly, at the time of sending from the key station 110, trigger signal strg is marked at the position anticipated by packets pkt1 to pkt3 which are packets caused to flow between time τs from the time of starting portion of packet cm1 succeeding to terminating portion of packet pkt3 which is actual switching timing. This is based on the probability that packets pkt1 to pkt3 are caused to undergo transmission without lavishness and shortage via line between time τs.

However, because of fluctuation in point of time of packet arrival interval taking place by overload, etc. during transmission, arrival intervals of packets pkt1 to pkt3 change. For this reason, packets pkt1 to pkt3 are received as packets pkt1' to pkt3' at the time of reception of the affiliated station 120 and delay takes place in timing by jitter jt. For this reason, even if time is passed by a predetermined anticipation time τs from detection of the trigger signal strg, packet pkt3' does not end.

On the other hand, at the affiliated station 120, since switching into flow of replacement materials cf1 to cf15 is automatically carried out after the predetermined time τs from detection of the trigger signal strg, switching is carried out in the state where packet pkt3' does not remain to be ended, resulting in the inconvenience that cut Cut as shown takes place.

In addition, when switching into original televising master is carried out after replaced materials cf1 to cf15 (e.g., CM material of 15 seconds) end, original materials cm1 to cm 15 flowing in the televising master are such that remaining portion (residual) Rsd is televised in the state where packet cm 15 does not end by the above-described timing delay. Namely, there takes place inconvenience that a portion of original material which must not primarily appear remains, and is televised in the state where such a portion is not erased.

For example, there takes place inconvenience that a portion of remaining other commercial appears at the time of end of a certain commercial. Moreover, while explanation has been given in FIG. 3 by taking delay by time fluctuation as an example, such inconvenience similarly takes place also in the case where lead operation is carried out by time fluctuation in a manner opposite to the above. In the case where switching is carried out by sending of stream, there are instances where there may result further unnatural switching.

As a result, in the broadcasting system of the conventional type, there was the possibility that not only dignity of televising contents is injured, but also impression of sponsor who provides corresponding program is injured.

On the other hand, also in sending via analog line, deviation of timing similarly takes place. FIG. 4 is an explanatory view thereof. The key station 110 issues switching signal at 57 seconds 59 minutes 18 hours which is earlier by 3 seconds prior to 00 seconds 00 minutes 19 hours at which switching from program to key CM should be carried out to send out such switching signal to the affiliated station 120 serving as local station via analog line 102. However, in the case where arrival to the affiliated station 120 of switching signal is delayed by, e.g., 1 sec. by occurrence of line delay so that arrival time is 58 seconds 59 minutes 18 hours, the automatic sending control unit 122 executes automatic switching after predetermined three seconds from arrival of switching signal at the affiliated station 120. For this reason, actual switching is executed at 01 seconds 00 minutes 19 hours delayed by delay time in place of the 00 seconds 00 minutes 19 hours. As a result, timing deviation similar to that in the case of the above-mentioned sending via the digital line took place, resulting in the possibility that degradation of dignity of televising contents may take place. Namely, the first problem of the conventional broadcasting system resides in that dignity of televising contents is degraded by inconvenience taking place at the time of switching of material at respective affiliated stations.

In addition, in the conventional key station, there are required, as equipments and human resources, 1. collecting equipments and persons who are in charge of collection in the case where collection of materials is carried out also at the key station,
2. editing equipments and persons who are in charge of editing in the case where material editing is carried out also at the key station,
3. bank equipments (for current use and reserve) and management staffs.
4. schedulers (scheduling equipments) and persons who are in charge of scheduling,
5. automatic sending equipments to affiliated stations (for current use and reserve) and sending management staffs,
6. transmitting equipments (for current use and reserve) and transmitting management staffs in the case where broadcast is carried out also at the key station. Moreover, in the conventional key station, marking system for marking trigger signal (e.g., net queue) is especially indispensable, but its issuance system is complicated. Namely, the second problem of the conventional broadcasting system resides in that equipment cost and use cost of the sending system of the key station side are increased, and cost is increased because of requirement of the number of persons.

On the other hand, in the conventional respective affiliated stations, there are required, as equipments and human resources, 1. collecting equipments and persons who are in charge of collection,
2. editing equipments and persons who are in charge of editing,
3. bank equipments (for current use and reserve) and management staffs,
4. schedulers (scheduling equipments) and persons who are in charge of scheduling,
5. automatic sending equipments (for current use and reserve) and sending management staffs,
6. transmitting equipments (for current use and reserve) and transmitting staffs. There was the present situation where many equipments/machine parts and staffs in charge are all required. Especially, at the automatic sending equipment of the affiliated station, there was indispensable function to detect trigger signal from televising master received from the key station to switch material under real time control on the basis of this trigger signal to re-organize televising contents peculiar to the own station. The third problem of the conventional broadcasting system resides in that cost is increased as the result of the fact that equipments and staffs are required for trigger signal detection and televising contents re-organization at respective affiliated stations.

Further, the fourth problem of the conventional broadcasting system resides in that cost is increased as the result of the fact that respective affiliated stations require preliminary automatic sending equipments and related staffs. The preliminary equipments are worked at the time of emergency. Because plural affiliated stations are respectively provided with preliminary equipments, total number of preliminary equipments is increased. Moreover, because these preliminary equipments are not frequently worked, working efficiency is very low. For this reason, a measure for rationalization was required.

In addition, in accordance with the configuration according to the prior art, it was not easy from a technical point of view that a certain affiliated station (e.g., station A) confirms existence of material originally produced and archived at other affiliated station (e.g., station B), and carries out incorporation into televising contents for the own station (station A) by making use of that material. Namely, the fifth problem of the conventional broadcasting system resides in that there do not exist measures for efficiently executing transmission/reception of information/data and command between affiliated stations required in the case where material caused to undergo management at a certain affiliated station is utilized at other affiliated station.

DISCLOSURE OF THE INVENTION

An object of this invention is to provide a broadcasting method, a broadcasting system and a contents organizing and supplying center which permit broadcast of high dignity where there are no break in middle of televising flow and/or appearance of excess televising component by rationalized equipments, and facilitate utilization of materials that other broadcasting station carries out production and management.

This invention contemplates solving problems of the prior arts and attaining the above-described object, and a broadcasting method according to this invention is directed to a broadcasting method applied to a broadcasting system in which a central broadcasting station and plural affiliated broadcasting stations are connected through network, and respective broadcasting stations transmit, to viewers, plural materials constituted by at least one of image and sound as televising contents organized in accordance with a predetermined order to televise such materials, and comprises a forwarding step of allowing the respective affiliated broadcasting stations to forward material and organization information for material to the central broadcasting station, a sending step of allowing the central broadcasting station to organize televising contents for affiliated broadcasting stations on the basis of the material and the organization information for material to send the televising contents to the affiliated broadcasting stations via the network, and a transmitting step of allowing the affiliated broadcasting broadcasting stations to receive the televising contents for affiliated broadcasting stations sent from the central broadcasting station via the network to televise the televising contents by transmitting.

In accordance with the broadcasting method according to this invention, material and organization information for material are forwarded from the respective affiliated broadcasting stations to the central broadcasting at the forwarding step. Then, when televising contents organization for respective affiliated broadcasting stations based on the material and the organization information for the material is made by the sending step of the central broadcasting station, televising contents are respectively sent to corresponding affiliated broadcasting stations via network, and televising contents are transmitted toward viewers by the transmitting step and are broadcasted at respective affiliated broadcasting stations. Accordingly, at the respective affiliated broadcasting stations, the organization step and the sending step for televising contents are omitted. On the other hand, at the central broadcasting station, timing notification step used for organization and sending at respective affiliated broadcasting stations is omitted.

Moreover, the broadcasting method according to this invention may comprise an information management step of allowing the central broadcasting station to store at least any one of materials and organization information for materials which have been forwarded from the respective affiliated broadcasting stations so that reference can be made, and an information reference step of allowing an arbitrary one of the affiliated broadcasting stations to request the central broadcasting station to make reference to stored content to allow the central broadcasting station to accept reference request to forward the corresponding stored content to the affiliated broadcasting station to allow the affiliated broadcasting station to receive the forwarded stored content.

In accordance with such a broadcasting method, material forwarded from each affiliated broadcasting station is stored by the information management step. In addition, at the information reference step, this stored material is caused to undergo not only reference from the central broadcasting station and affiliated broadcasting station, but also reference from arbitrary other affiliated broadcasting station.

As a result, at the central broadcasting station, televising contents for respective affiliated broadcasting stations are produced by using the material obtained by reference. Moreover, by arbitrary other broadcasting station, material prepared at a station except for the own station is caused to undergo reference, and the content of that material is examined. Further, organization information for materials forwarded from respective affiliated broadcasting stations are stored at the central broadcasting station by the information management step. Accordingly, the stored organization information are caused undergo reference from the central broadcasting station or the affiliated broadcasting station.

Further, the broadcasting method according to this invention may comprise a sending step of allowing the central broadcasting station to organize televising contents for the own station to send out it to transmitting means for the own station, and a transmitting step of allowing the transmitting means which has received the televising contents to transmit the received televising contents.

In accordance with such a broadcasting method, not only the central broadcasting station organizes televising contents for respective affiliated broadcasting stations to send out them, but also televising contents for the own station are organized and are sent out at the sending step of the central broadcasting station, and are transmitted by the transmitting step. Thus, televising contents are provided from the central broadcasting station to jurisdiction area.

Further, the broadcasting method according to this invention may comprise a utilization step for other station material of allowing at least any one of the affiliated broadcasting stations and the central broadcasting station to incorporate material that other station has forwarded to the central broadcasting station into at least a portion of televising contents for the own station.

In accordance with such a broadcasting method, by the utilization step for other station material respectively provided at respective affiliated broadcasting stations or the central broadcasting station, material that other station has forwarded to the central broadcasting station is incorporated into the televising contents for the own station.

Furthermore, a broadcasting system according to this invention is directed to a system in which a central broadcasting station and plural affiliated broadcasting stations are connected through network, and respective broadcasting stations transmit, to viewers, plural materials constituted by at least one of image and sound as televising contents organized in accordance with a predetermined order to televise them, wherein the respective affiliated broadcasting means may comprise forwarding means for forwarding materials and organization information for materials to the central broadcasting station, and transmitting means for receiving the televising contents for the affiliated broadcasting stations sent from the central broadcasting station via the network to televise the televising contents by transmitting; and the central broadcasting station may comprise sending means for organizing televising contents for affiliated broadcasting station on the basis of material and organization for material which have been forwarded from the affiliated broadcasting station to send the televising contents to the affiliated station via the network.

In accordance with such a broadcasting system, materials and organization information for materials are forwarded to the central broadcasting station by the forwarding means of the respective affiliated broadcasting stations. At the central broadcasting station, by the sending means, organization of televising contents for respective affiliated broadcasting stations based on material and organization information of material is carried out, and televising contents are respectively sent to corresponding affiliated broadcasting station via the network. At respective affiliated broadcasting stations which have received televising contents, the televising contents are transmitted toward viewers by the transmitting means, and are broadcasted. Accordingly, at the respective affiliated broadcasting stations, means according to organization and sending of televising contents are omitted. On the other hand, at the central broadcasting station, means according to notification of timing used for organization and sending at respective affiliated broadcasting stations are omitted.

Here, in the broadcasting system according to this invention, the central broadcasting station may comprise information management means for storing at least any of materials and organization information for materials which have been forwarded from the respective affiliated broadcasting stations so that reference can be made, and for accepting reference request of stored content from an arbitrary one of the affiliated broadcasting stations to forward the corresponding stored content to the affiliated broadcasting station. In addition, the affiliated broadcasting station may comprise information reference means for requesting the central broadcasting station to make reference to stored content to receive the forwarded stored content.

In accordance with such a broadcasting system, materials forwarded from the respective affiliated broadcasting stations are stored by the information management means of the central broadcasting station. These stored materials are caused to undergo not only reference by the central broadcasting station and consultation from corresponding affiliated broadcasting station which has forwarded material, but also reference from arbitrary other affiliated broadcasting station by the information management means of the central broadcasting station and the information reference means of the respective affiliated broadcasting stations.

As a result, at the central broadcasting station, televising contents for respective affiliated broadcasting stations are produced by using materials obtained by reference. Moreover, by arbitrary other broadcasting station, material prepared by station except for the own station is caused to undergo reference, and the content of that material is examined. Further, by the information management means, organization information for materials sent from respective affiliated broadcasting stations are stored at the central broadcasting station. Accordingly, stored organization information is caused to undergo reference from the central broadcasting station or corresponding affiliated broadcasting station.

Furthermore, in the broadcasting system according to this invention, the central broadcasting station may comprise sending means for organizing televising contents for the own station to send the televising contents to transmitting means for the own station, and transmitting means for receiving the televising contents to transmit them.

In accordance with such a broadcasting system, not only the central broadcasting station performs a function to organize televising contents for respective affiliated broadcasting stations to send them, but also organization of televising contents for corresponding central broadcasting station, i.e., own station is carried out, and the televising contents thus organized are sent out and are transmitted. Thus, televising contents are offered to jurisdiction area by the central broadcasting station.

Moreover, in the broadcasting system according to this invention, at least any one of the affiliated broadcasting station and the central broadcasting station may comprise utilization means for other station material for incorporating material that other station has forwarded to the central broadcasting station into at least a portion of televising contents for the own station.

In accordance with such a broadcasting system, the utilization means for other station material respectively provided at respective affiliated broadcasting station or the central broadcasting station incorporate material that other station has forwarded to the central broadcasting station into televising contents for the own station.

Further, a contents organizing and supplying center according to this invention comprises connecting means for carrying out network connection with respect to plural broadcasting stations which receive televising contents sent from the external to transmit the televising contents to viewers to thereby carry out broadcast, and plural sending means for organizing plural materials in accordance with a predetermined order on the basis of materials constituted by at least one of image and sound and organization information for materials which have been forwarded from respective broadcasting stations to allow the materials thus organized to be televising contents for corresponding broadcasting stations to respectively send them to corresponding broadcasting stations via the network.

In accordance with such a contents organizing and supplying center, when materials and organization information for materials are forwarded from respective broadcasting stations, organization of televising contents for respective broadcasting stations based on materials and organization information for materials is carried out, and the televising contents thus organized are respectively sent to corresponding broadcasting stations via the network. Respective broadcasting stations which have received these televising contents transmit them toward viewers. Thus, broadcast is carried out. Accordingly, at the contents organizing and supplying center side, notification of timing used for organization and sending of televising contents at respective broadcasting stations becomes unnecessary. Thus, means and processing according to timing notification are omitted. On the other hand, at the respective broadcasting side, means and processing according to organization and sending of televising contents are omitted.

BRIEF DESCRIPTION OF THE DRAWINGS

FIG. 10 is a view for explaining an example of organization information file.

FIG. 12 is a view for explaining operation mode of the broadcasting system shown in FIG. 5.

BEST MODE FOR CARRYING OUT THE INVENTION

Preferred embodiments of this invention will now be described in detail with reference to the attached drawings. It is to be noted that embodiments which will be described below are a portion of preferred example for indicating essential configuration and action of this invention, and there are instances where various restrictions preferable from a technical point of view are attached, but the scope of this invention is not limited to these forms as long as the description to the effect that this invention is particularly limited does not exist.

Figure 1:
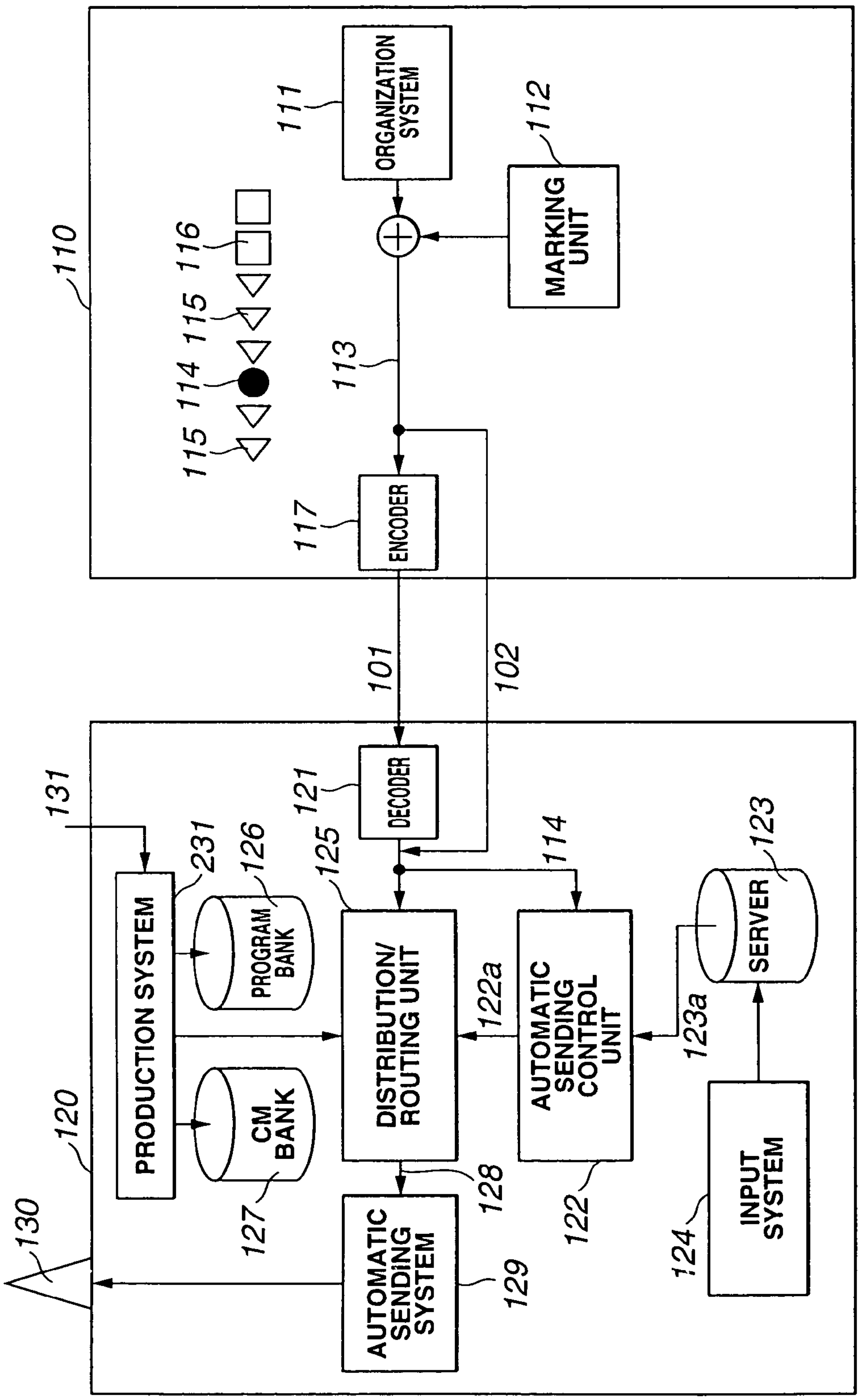
FIG. 1 is a block diagram of a conventional broadcasting system.
Figure 2:
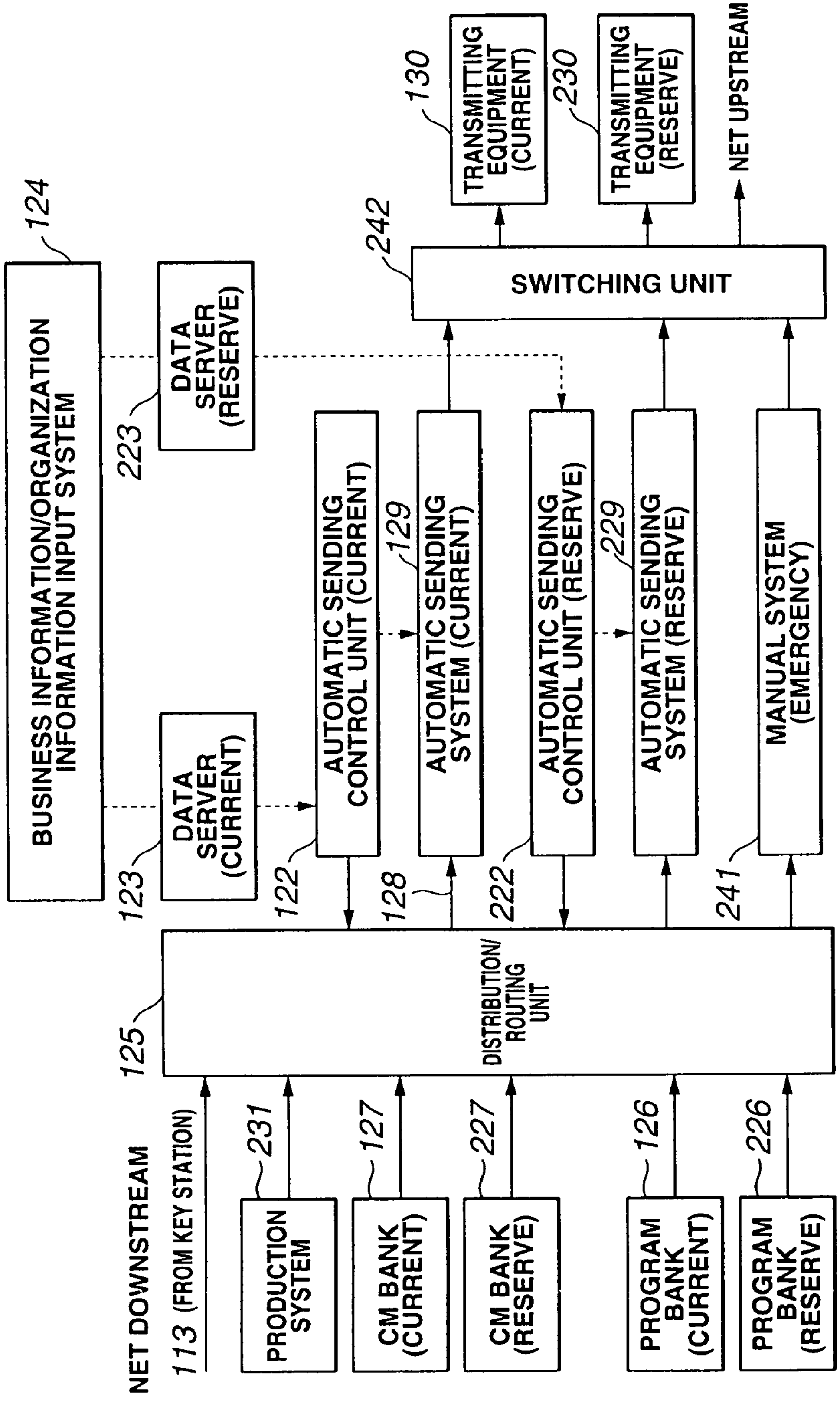
FIG. 2 is a block diagram of a conventional affiliated station.
Figure 3:
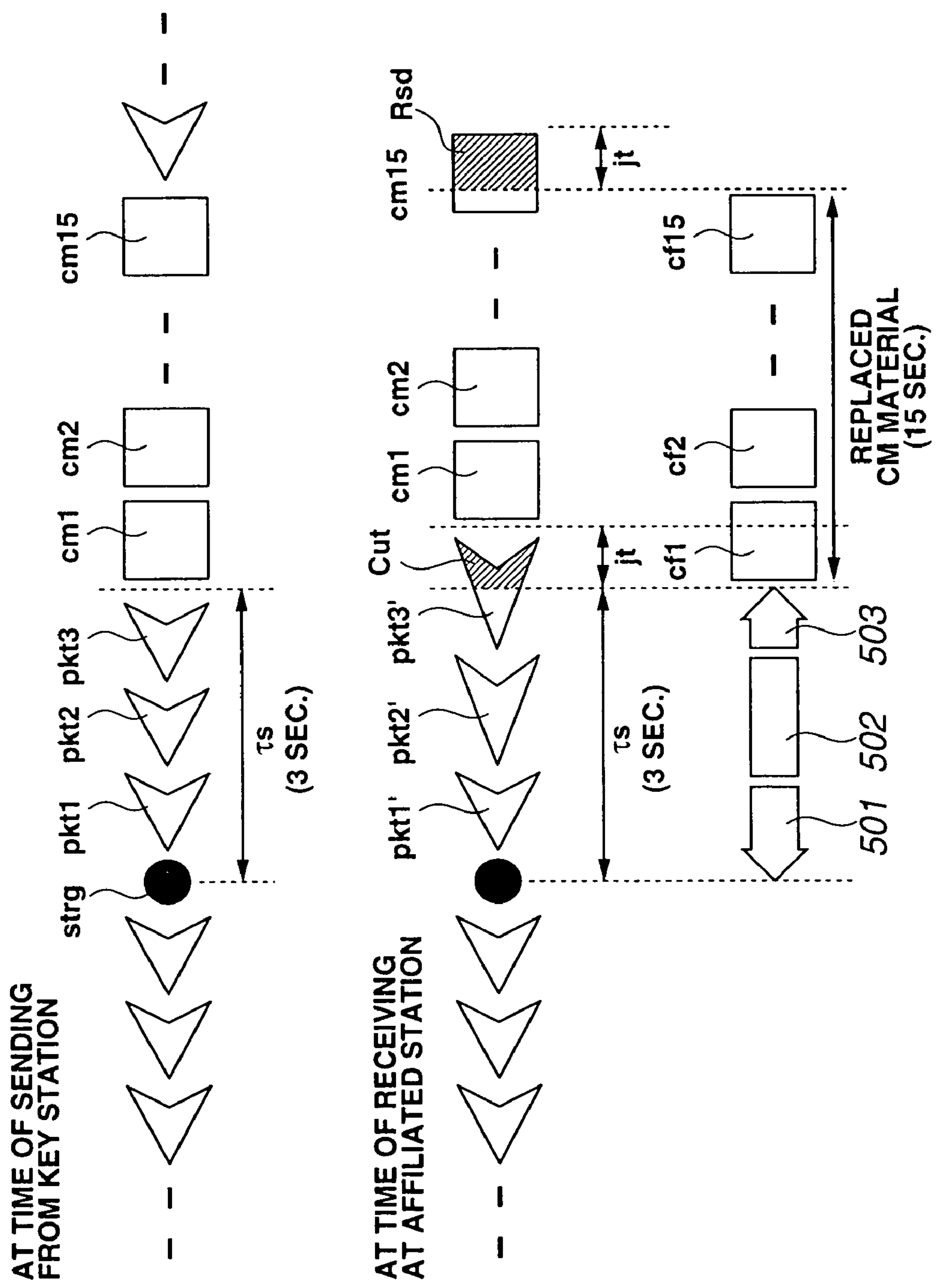
FIG. 3 is a view for explaining timing deviation at the time of packet transfer taking place in the conventional broadcasting system.
Figure 4:
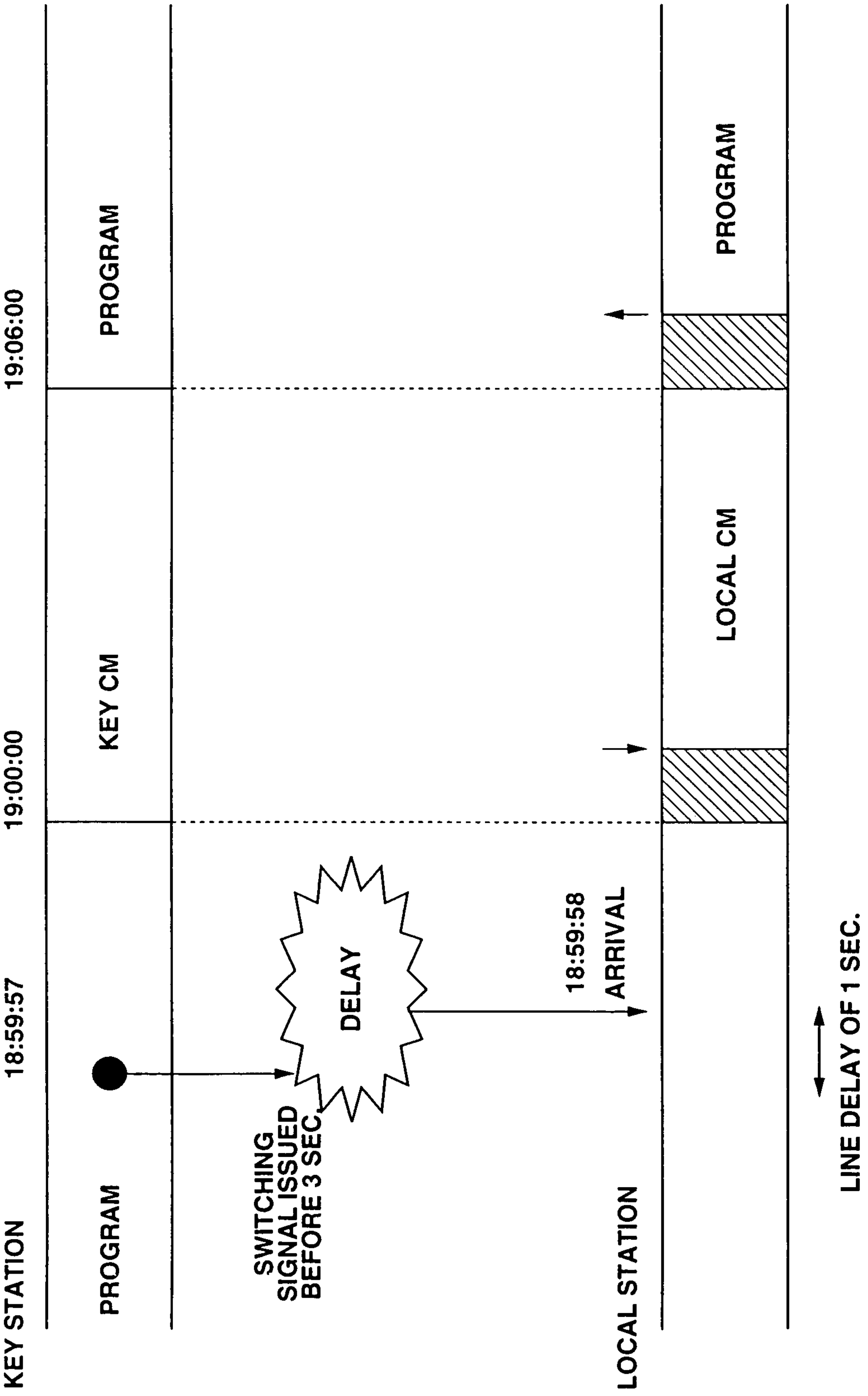
FIG. 4 is a view for explaining timing deviation taking place by delay of analog line.
Figure 5:
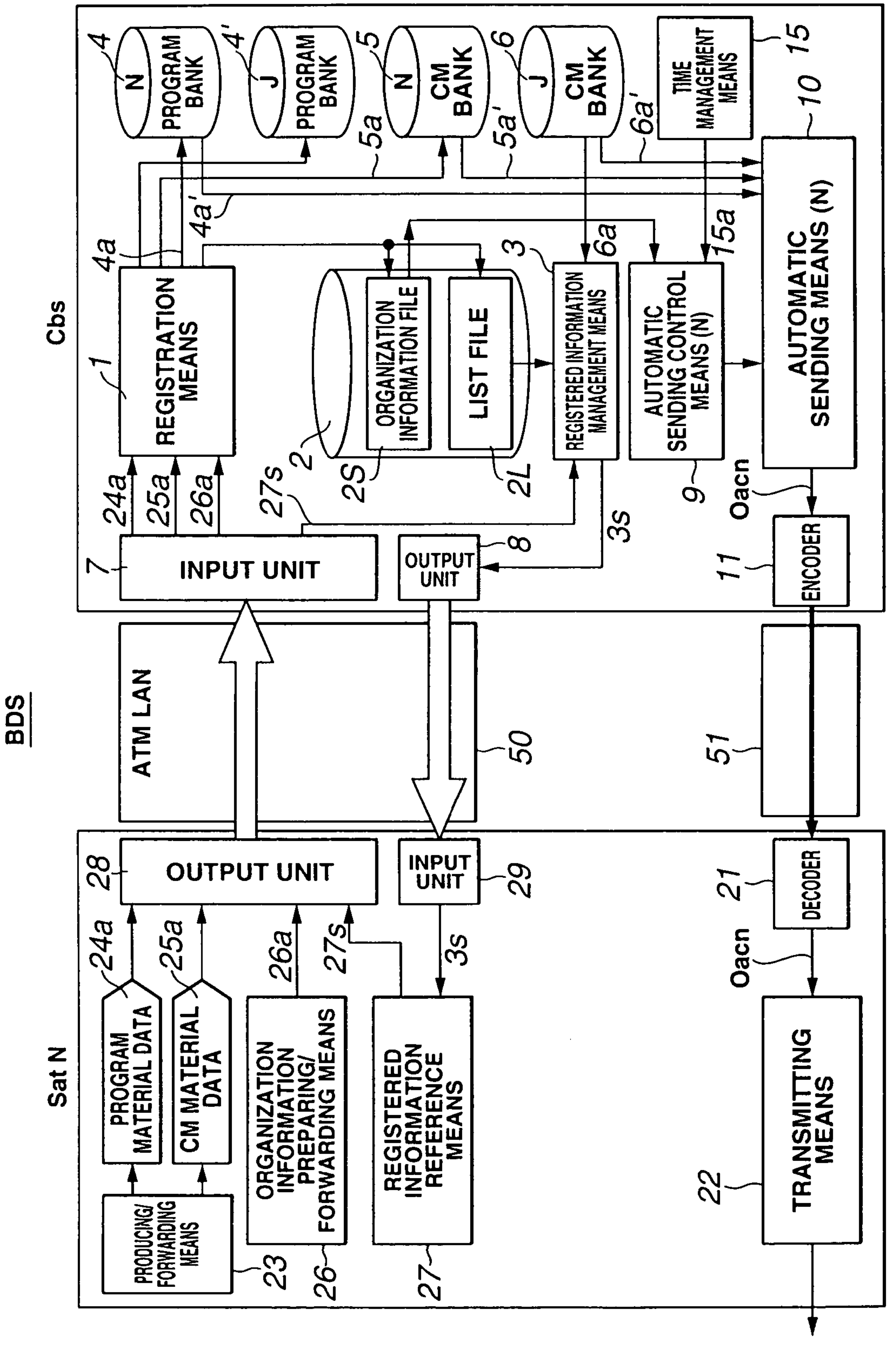
FIG. 5 is a block diagram of a broadcasting system shown as an embodiment of this invention.
Figure 6:
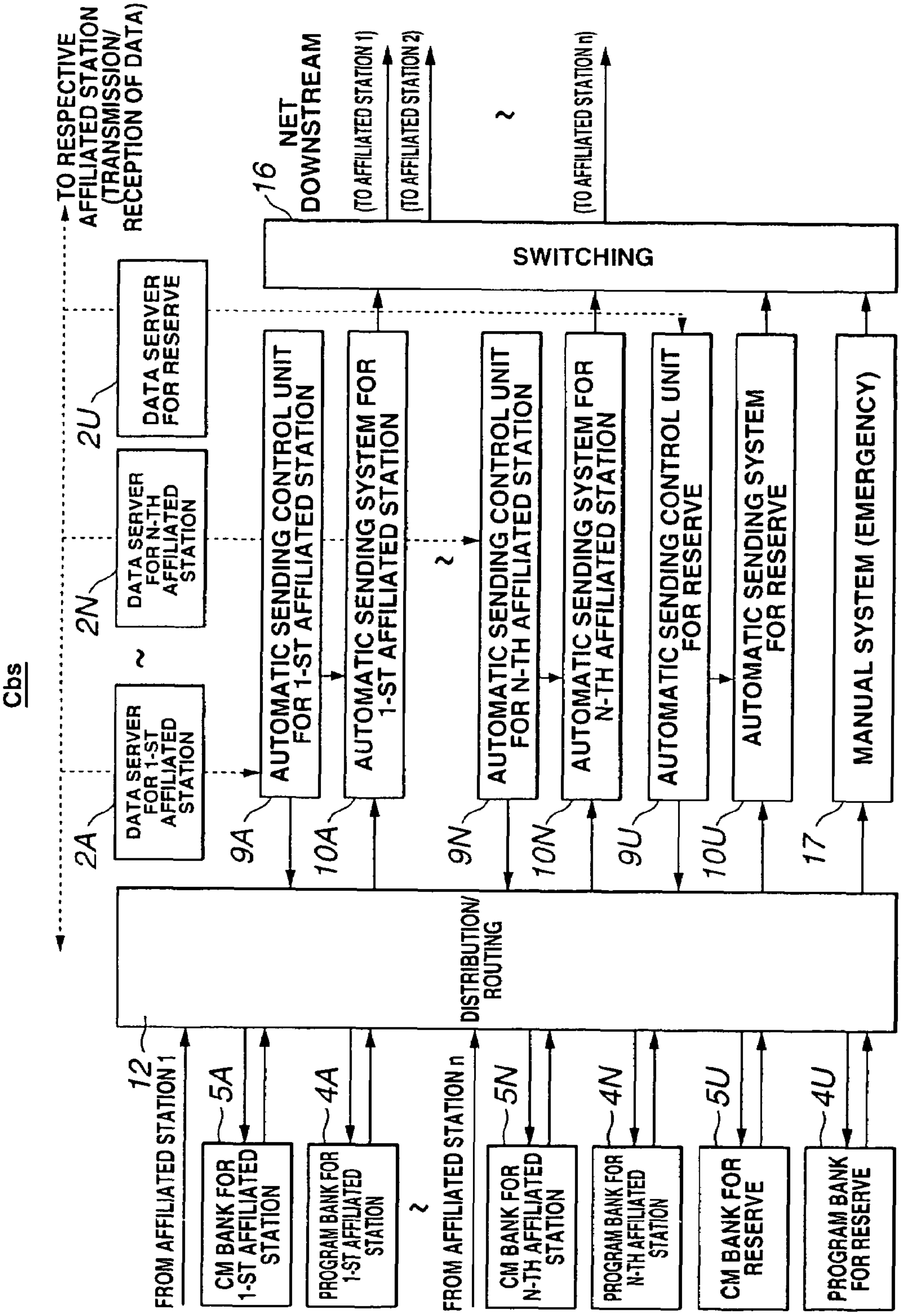
FIG. 6 is an essential part block diagram showing an example of central station shown in FIG. 5.

FIG. 5 is a view showing block configuration of a broadcasting system shown as an embodiment of this invention, and FIG. 6 is a view showing essential part block configuration of central station shown in FIG. 5. As shown in FIGS. 5 and 6, the broadcasting system BDS according to this invention comprises a central station Cbs, plural affiliated broadcasting stations represented by the N-th affiliated broadcasting station SatN, and a data communication network 50 and a dedicated digital line 51 as network which are means for connecting these broadcasting stations.

It is to be noted that the N-th affiliated broadcasting station SatN is taken as an example among plural affiliated broadcasting stations in the following description. It is further to be noted that the central station is the same meaning as the central broadcasting station and the affiliated station is the same meaning as the affiliated broadcasting station in the following description.

In this embodiment, the broadcasting system BDS has central casting function proposed in this invention. The central casting function is a function to concentrate and integrate individual sending equipments that respective affiliated stations such as the N-th affiliated broadcasting station SatN, etc. conventionally respectively equip or install into the central station Cbs to thereby carry out management in a concentrated manner to rationalize equipment, use and maintenance of the entirety of the broadcasting system BDS.

Accordingly, the central station Cbs is operative as core portion of the system having central casting function, i.e., central casting station, and comprises constituting portions according to respective functions of 1. registration function,
2. storage/keeping function,
3. registered information management function, and
4. automatic sending function. Further, the central station Cbs has a transmitting function to personally carry out broadcast to the jurisdiction area therearound.

In the broadcasting system shown as more practical example of this invention, an input unit 7 and registration means 1 participate in registration function, and a data server 2, a program bank 4 for the N-th affiliated station, a CM bank 5 for the N-th affiliated station and a CM bank 6 for the J-th affiliated station, etc. participate in storage/keeping function.

The input unit 7 is constituted with intelligent interface having decode function and judgment function, and serves to receive program material data 24*a* to which command forwarded from the N-th affiliated broadcasting station SAT via the data communication network 50 is attached and CM material data 25*a* to which command is similarly attached to decode such data to confirm destination thereafter to deliver them to the registration means 1. Further, the input unit 7 receives organization information data 26*a* with notification information forwarded from the N-th affiliated broadcasting station SAT via the data communication network 50 to decode this data to confirm the decoded data thereafter to deliver it to the registration means 1.

The registration means 1 is constituted as computer system, and serves to separate the command attached program material data 24*a* into command and program material 4*a*, and to separate the command attached CM material data 25*a* into command and CM material 5*a* to store the program material 4*a* and the CM material 5*a* into the program bank 4 for the N-th affiliated station and the CM bank 5 for the N-th affiliated station on the basis of respective commands, or to update such stored contents on the basis of respective commands. Further, the registration means 1 sends list of the program material 4*a* and the CM material 5*a* to the data server 2 to allow the data server 2 to form or update list file 2L. In addition, the registration means 1 is operative so that when this means receives organization information data 26*a* with notification information, it sends this organization information to the data server 2 on the basis of this notification information to allow the data server 2 to form or update organization information file 2S.

In this example, function of the registration means 1 is prepared as program that computer can read and execute.

As the program bank and the CM bank, e.g., a program bank 4' for the J-th affiliated station and the CM bank 6 for the J-th affiliated station as shown, etc. are provided in addition to the program bank 4 for the N-th affiliated station and the CM bank 5 for the N-th affiliated station. In a manner stated above, the program bank and the CM bank are prepared for exclusive use of respective affiliated stations, and such banks can be both constituted as logical bank on the computer system. Because the program bank or the CM bank is required to have recording/reproducing function of video/audio data which requires large capacity and high speed access, it is preferable that the physical bank is constituted with large capacity magnetic recording system or video server represented by, e.g., RAID. In this case, there may be employed a configuration such that respective program banks or respective CM banks according to plural affiliated stations are commonly mounted with respect to the RAID system.

The data server 2 is constituted with high speed accessible large capacity hard magnetic disc recording/reproducing apparatus, etc. Moreover, in the broadcasting system shown as this embodiment, in addition to registration information management means 3 and an output unit 8, the above-described input unit 7, the data server 2, list file 2L, organization information file 2S, the program bank 4 for the N-th affiliated station, the CM bank 5 for the N-th affiliated station, the program bank 4' for the J-th affiliated station, and the CM bank 6 for the J-th affiliated station, etc. participate in registered information management function, and function as information management means in cooperation.

In this embodiment, the input unit 7 receives registered information reference command 27*s* forwarded from the N-th affiliated broadcasting station SAT via the data communication network 50 to decode this command to confirm destination thereafter to deliver it to the registered information management means 3.

The registered information management means 3 is constituted as computer system, and serves to take out corresponding list file 2L or organization information file 2S from the data server 2 on the basis of registered information reference command 27*s*, or to take out corresponding program material 4*a*, CM material 5*a* and CM material 6*a*, etc. from the program bank 4 for the N-th affiliated station, the CM bank 5 for the N-th affiliated station, the program bank 4' for the N-th affiliated station, and the CM bank 6 for the J-th affiliated station, etc. to deliver them as file data or material data 3*s* to the output unit 8.

The output unit 8 is constituted with intelligent interface having encode function and judgment function, and serves to encode file data or material data 3*s* delivered from the registered information management means 3 to forward such data to the N-th affiliated broadcasting station SAT via the data communication network 50.

Automatic sending control means 9 for the N-th affiliated station, automatic sending means 10 for the N-th affiliated station, an encoder 11, and time management means 15 participate in the above-described automatic sending function.

The timer management means 15 is constituted by timer mechanism, and serves to deliver time information 15*a* to the automatic sending control means 9.

The automatic sending control means 9 for the N-th affiliated station is constituted as computer system, and serves to monitor organization information file 2S on the basis of time information 15*a* to send a control signal to the automatic sending means 10 for the N-th affiliated station similarly constituted as computer system to control the operation of the automatic sending means 10.

The automatic sending means 10 for the N-th affiliated station takes out materials 4*a'*, 5*a'*, 6*a'*, etc. from the program bank 4 for the N-th affiliated station, the CM bank 5 for the N-th affiliated station and the CM bank 6 for the J-th affiliated station (further program bank 4' for the J-th affiliated station), etc. in a predetermined order and at predetermined timings on the basis of control signal from the automatic sending control means 9 for the N-th affiliated station to organize televising contents Oacn to carry out automatic sending of the televising contents Oacn to a dedicated digital circuit 51 which is a transmitting line for image transmission via the encoder 11.

Here, as shown in FIG. 6, at the central station Cbs, there are prepared the first a data server 2A for the first affiliated station to a server 2N for the N-th affiliated station which serve as current data servers, and a data server 2U for reserve. Data servers are logical servers prepared for exclusive use of respective affiliated stations. In this case, there may be cmployed a configuration such that respective data servers for plural affiliated stations are commonly mounted on physical server comprised of, e.g., large capacity magnetic hard disc unit.

Moreover, at the central station Cbs, there are provided a program bank 4A for the first affiliated station to a program bank 4N for the N-th affiliated station which serve as current program banks, a program bank 4U for reserve, a CM bank 5A for the first affiliated station to a CM bank 5A for the N-th affiliated station to a bank 5N for the N-th affiliated station which serve as current CM banks, and a CM bank 5U for reserve.

Further, at the central station Cbs, there are provided, as the automatic sending control unit, an automatic sending control unit 9A for the first affiliated station to an automatic sending control unit 9N for the N-th affiliated station which serve as current unit and an automatic sending control unit for reserve, and there are similarly provided, as the automatic sending system serving as automatic sending means, an automatic system 10A for the first affiliated station to an automatic sending system 10N for the N-th affiliated station which serve as current units and an automatic sending system 10U for reserve. Furthermore, the central station Cbs is provided with a distribution/routing unit 12 for carrying out distribution/routing of signal/data flow between these respective components. The above-mentioned respective automatic sending control units and the distribution/routing unit 12 are constituted as the automatic sending control means.

In addition, the central station Cbs is provided, as emergency countermeasure means, with a manual system 17 used at the time of emergency, and a switching unit 16 for carrying out switching between current connection and preliminary connection (reserve) by operation of the manual system 17.

The data communication network 50 is embodied by any communication network which permits transmission/reception of bidirectional data. Especially, it is preferable that ATM/LAN which is LAN by ATM communication network (ATM network) is applied. The ATM/LAN is high speed broad band network in which image transmitting which governs data transmission between the central station Cbs and the N-th affiliated broadcasting station SatN at transmission speed of 155 M bits/sec. by cell base on the basis of the ATM standard is used as a premise. The data communication network 50 will be described below in the state where such network is described as ATM/LAN 50 which is an example thereof.

The dedicated digital line 51 is a line for carrying out, on real time basis, transmission of televising contents from the central station Cbs to the N-th affiliated broadcasting station SatN, and is constituted with optical cable network including submarine optical cable or domestic satellite channel for image transmission, etc.

The N-th affiliated broadcasting station Sat N comprises components according to respective functions of 1. Material production/registration function
2. Organization information production/registration function
3. Registered information reference function
4. Transmitting function Producing/forwarding means 23 and an output unit 28 participate in the above-described material production/registration function. The producing/forwarding means 23 is a unit adapted for producing, e.g., program material and/or CM material by non-linear editing system for editing material obtained by collection of data, etc. to allow respective materials to be material data to attach command for registration thereto, wherein the main part is constituted by computer system. The producing/forwarding means 23 outputs, to the output unit 28, program material data 24*a* to which registration command is attached and CM material data 25*a* to which registration command is attached.

The output 28 is constituted with MPEG transport stream protocol concordance having encode function, and serves to encode the program material data 24*a* and the CM material data 25*a* to which registration commands are respectively attached, which are delivered from the producing/forwarding means 23, to forward such encoded data to the central station Cbs via the data communication network 50.

Organization information preparing/forwarding means 26 and the above-mentioned output section 28 participate in the above-described organization information production registration function. The organization information preparing/forwarding means 26 serves to prepare organization information for organizing televising contents for this N-th affiliated broadcasting station SatN to attach notification information thereto to forward such information to the central station Cbs, wherein the main part is constituted by computer system. The organization information preparing/forwarding means 26 outputs organization information 26*a* to which notification information is attached to the output unit 28.

The output unit 28 encodes here organization information 26*a* delivered from the organization information preparing/forwarding means 26 to forward the encoded organization information to the central station Cbs via the data communication network 50.

Registered information reference means 27, an input unit 29 and the above-mentioned output unit 28 participate in the above-described registered information reference function. The registered information reference means 27 is a unit for making reference to information or data registered and stored in the central station Cbs, wherein the main part is constituted by computer system. Request for registered information reference is made by issuance of command. The issued command 27*s* includes request for file data reference or reference of registration material, and is outputted to the output unit 28.

The output unit 28 encodes here command 27*s* delivered from the registered information reference means 27 to forward the encoded command to the central station Cbs via the data communication network 50.

On the other hand, the input unit 29 is constituted with intelligent interface of MPEG transport stream protocol concordance having decode function and judgment function, and serves to decode file data or registration material data which is response to reference request forwarded via the data communication network 50 from the central station Cbs to deliver restored (decoded) data 3*s* to the registered information reference means 27.

A decoder 21 and transmitting means 22 participate in the above-described transmitting function. The decoder 21 is operative so that when the decoder 21 receives stream sent from the central station Cbs via dedicated digital line 51 which is communication line for transmission of image, it decodes that stream to allow the decoded stream to be stream of televising contents Oacn of real time to input it to the transmitting means 22.

The transmitting means 22 receives televising contents Oacn to broadcast it from antenna. Thus, the televising contents that the central station Cbs has sent are broadcasted from the N-th affiliated broadcasting station SatN on real time basis.

Figure 7:
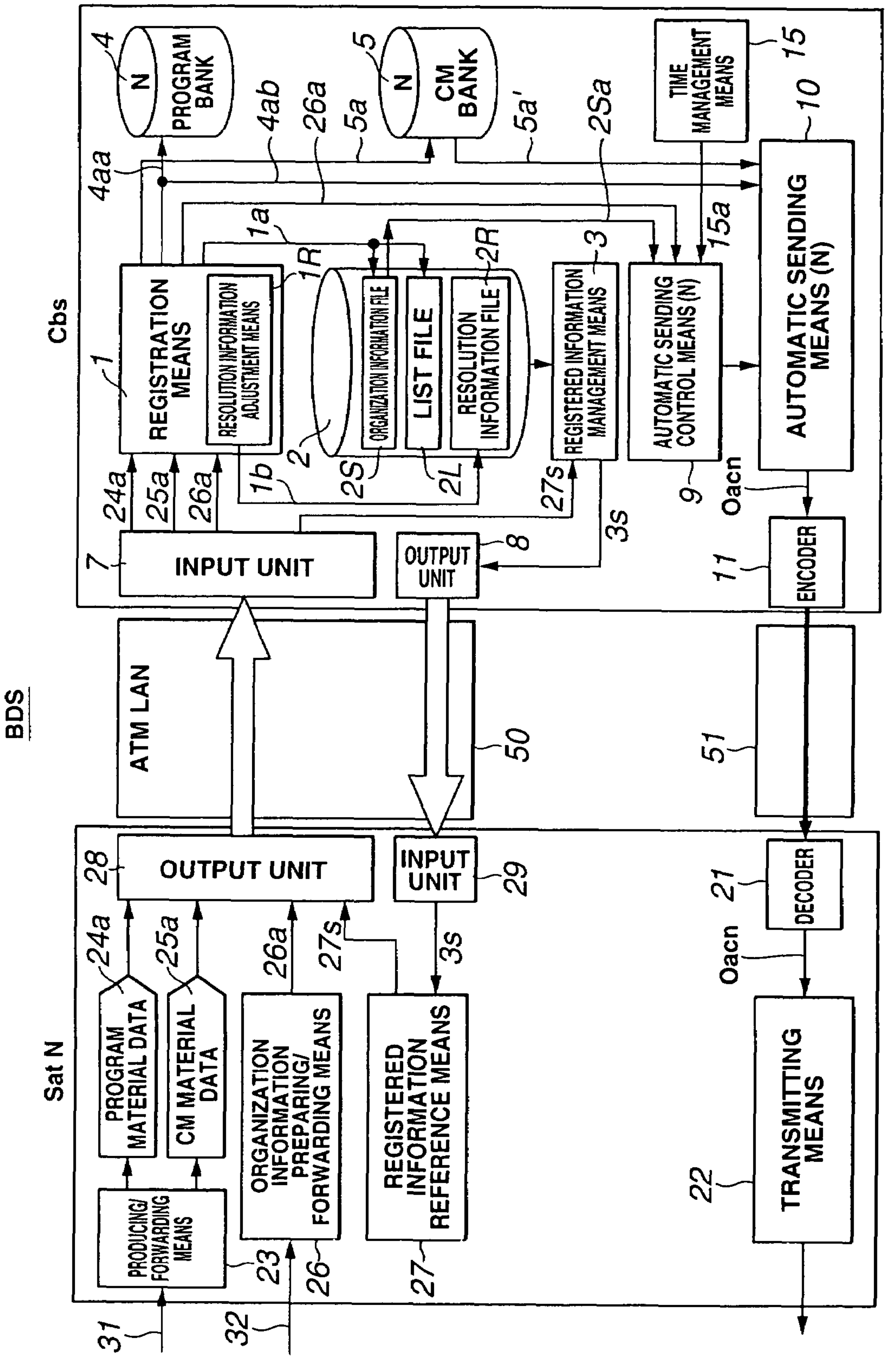
FIG. 7 is a block diagram of an example where broadcasting system shown as the embodiment of the broadcasting system of this invention is further expanded.

FIG. 7 is a block diagram of function expanded broadcasting system BDS. The configuration shown in this figure has a function to cope with real time televising such as live program by the on-the-spot relaying, etc. Further, this configuration has a management function for information according to resolutions of images of various sources forwarded from respective affiliated stations such as the N-th affiliated broadcasting station Sat N, etc.

In the real time televising of live program, etc., the producing/forwarding means 23 of the N-th affiliated broadcasting station SatN accepts real time materials 31 simultaneously forwarded from plural cameras on the spot to allow them to be multiplexed data to forward program material data 24*a* or CM material data 25*a* in which command indicating that corresponding material is multiplexed and real time material is attached to the central station Cbs via the output unit 28.

Further, the organization information producing/forwarding means 26 of the N-th affiliated broadcasting station SatN accepts, e.g., organization designation (instruction) 32 according to switching of camera or switching into CM which is inputted from producing staff of the above-mentioned on-the-spot relaying program to prepare organization information 26*a* on the real time basis to forward such organization information to the central station Cbs via the output unit 28.

Registration means 1 of the central station Cbs is operative so that when this means confirms that corresponding material is real time material from attached command at the time of reception of program material data 24*a* or CM material data 25*a*, this means 1 separates the real time material into command and real time program material 4*ab* in connection with the program material data 24*a*, and separates the real time material into command and CM material 5*a* in connection with the CM material data 25*a* to forward the real time program material 4*ab* to automatic sending means 10 for the N-th affiliated station.

In the case where film prepared in advance is forwarded to the registration means 1 side at a timing slightly earlier than actual sending timing unlike the real time program material 4*ab* even if the CM material 5*a* is real time material, this CM material 5*a* is stored into the CM bank 5 for the N-th affiliated station to update organization information file 2S. This updating is updating for providing information relating to CM material 5*a* when automatic sending control means 9 for the N-th affiliated station which will be described later executes processing of real time televising.

Moreover, in the case where the CM material 5*a* is forwarded at actual sending timing similarly to the real time program material 4*ab*, the registration means 1 immediately forwards the CM material 5*a* to the automatic sending means 10 for the N-th affiliated station without passing through the CM bank 5.

Simultaneously, the registration means 1 directly forwards organization information 26*a* of real time, without passing through organization information file 2S, immediately along with notification to the effect that corresponding televising is real time televising, to the automatic sending control means 9 for the N-th affiliated station.

It is to be noted that the registration means 1 may employ such an approach to forward real time program material 4*ab* to the automatic sending means 10 for the N-th affiliated station, and to store it into program bank 4 for the N-th affiliated station as program material 4*aa*.

The automatic sending control means 9 for the N-th affiliated station is operative so that when this means 9 receives, from the registration means 1, notification to the effect that corresponding televising is real time televising and organization information 26*a* of real time, it confirms that corresponding televising is real time televising to organize forwarded real time program material 4*ab* on the basis of organization information 26*a* to send a control signal for sending to the automatic sending means 10 for the N-th affiliated station. Further, the automatic sending control means 9 for the N-th affiliated station sends, to the automatic sending means 10 for the N-th affiliated station, a control signal for taking out corresponding CM material 5*a*' from the CM bank 5 by making reference to updated organization information file 2S to send it.

The automatic sending means 10 for the N-th affiliated station switches real time program material 4*ab* and CM material 5*a*', etc. in accordance with designated order and timing on the basis of the control signal from the automatic sending control means 9 for the N-th affiliated station to carry out automatic sending of these materials as real time televising contents Oacn to the dedicated digital line 51 which serves as communication line for image transmission via the encoder 11. In a manner stated above, real time televising is carried out.

Management function for information according to resolution of image will now be described. Different sources having resolution of high dignity or low dignity are forwarded at random from respective affiliated stations such as the N-th affiliated broadcasting station SatN, etc.

Resolution information adjustment means 1R that the registration means 1 has confirms resolutions of forwarded respective sources to adjust resolution information 1*b* thereafter to send various sources different in resolution to the data server 2 to allow the data server 2 to form or update resolution information file 2R thereon. Resolution information 1*b* within resolution information file 2R is reference from the automatic sending control means 9 or registered information management means 3 for the N-th affiliated station. Thus, the automatic sending control means 9 for the N-th affiliated station can confirm resolution of remarked material to send corresponding control designation to the automatic sending means 10 for the N-th affiliated station. In addition, registered information management means 3 can forward registered resolution information of remarked material to respective affiliated stations such as the N-th broadcasting station Sat N, etc.

The broadcasting system BDS shown as this embodiment comprises information management means in a broad sense for allowing the central station Cbs to store material or organization information for the material forwarded from respective affiliated stations represented by the N-th affiliated station SatN (hereinafter referred to as respective affiliated stations SAT) so that reference can be made, and to accept reference request of stored content from arbitrary affiliated station SAT to forward corresponding stored contents to the affiliated station SAT, and sending means in a broad sense for organizing televising contents for affiliated station SAT in which plural materials constituted by image/sound are organized in accordance with a predetermined order on the basis of material and organization information for the material to send such televising contents to this affiliated station SAT via network.

Moreover, the broadcasting system BDS shown as this embodiment comprises forwarding means in a broad sense for allowing the affiliated station SAT to forward material and organization information for the material to the central station Cbs for the purpose of registration, information reference means in a broad sense for receiving forwarded storage information or data, and transmitting means for receiving televising contents for affiliated station SAT sent from the central station Cbs via network to transmit the televising contents to viewer to televise them.

In accordance with this broadcasting system BDS, materials and organization information for the materials are forwarded to the central station Cbs by forwarding means of respective affiliated stations SAT, at which they are registered and stored. At the central station Cbs, by sending means, organization of televising contents for respective affiliated stations SAT based on materials and organization information for the materials is made. Thus, televising contents are respectively sent to corresponding affiliated stations SAT via network. In addition, at respective affiliated stations which have received televising contents, televising contents are transmitted toward viewers by transmitting means so that they are broadcasted.

Accordingly, at respective affiliated stations SAT, means according to organization and sending of televising contents may be omitted. Moreover, since it is unnecessary to re-organize such televising contents at the affiliated station SAT, means according to notification of timings used for organization and sending at respective affiliated stations SAT which have been required in the prior art may be omitted. Namely, it is unnecessary to mark trigger signal indicating timing between materials.

Further, in the broadcasting system shown as this embodiment, materials forwarded from respective affiliated stations SAT are stored at information management means in a broad sense of the central station Cbs. By information management means of the central station Cbs and information reference means of respective affiliated stations SAT, such materials can be caused to undergo reference from the central station Cbs, and can be caused to also undergo reference from affiliated station SAT which has forwarded material or arbitrary other affiliated station SAT. As a result, the central station Cbs makes reference to materials at arbitrary time, thereby making it possible to produce televising contents for respective affiliated stations SAT by using obtained materials.

Further, arbitrary other broadcasting station can make reference to material prepared at a station except for the own station, and can study or examine the content of that material to judge whether or not that material can be utilized for the own station. In addition, since the information management means stores organization information for materials forwarded from respective affiliated stations SAT at the central station Cbs, it is possible to make reference to stored organization information from the central station Cbs or the affiliated station SAT as occasion demands.

In the prior art, it was not easy from a technical point of view that a certain affiliated station SAT confirms existence of materials peculiarly produced and stored at other affiliated station SAT, and to carry out incorporation into televising contents for the own station by making use of that material. On the other hand, in accordance with the broadcasting system shown as this embodiment, material bank is installed at the central station Cbs to carry out preservation and management of materials sent from respective affiliated stations SAT, whereby respective affiliated stations SAT can retrieve materials which have caused to undergo preservation and management, and respective affiliated stations SAT can prepare televising contents for the own stations by utilizing not only materials produced at the own stations, but also materials produced at other affiliated stations SAT.

Moreover, the central station Cbs may be caused to be configuration comprising sending means for not only producing televising contents for respective affiliated stations SAT to output them, but also organizing televising contents for the own station to send such televising contents to transmitting means for the own station, and transmitting means for receiving such televising contents to transmit them.

Thus, the central station Cbs can not only performs a function to organize televising contents for respective affiliated stations SAT to send them, but also organize televising contents for this central station Cbs, i.e., the own station to send and transmit such televising contents to offer televising contents to the jurisdiction area of the central station Cbs.

Figure 8:
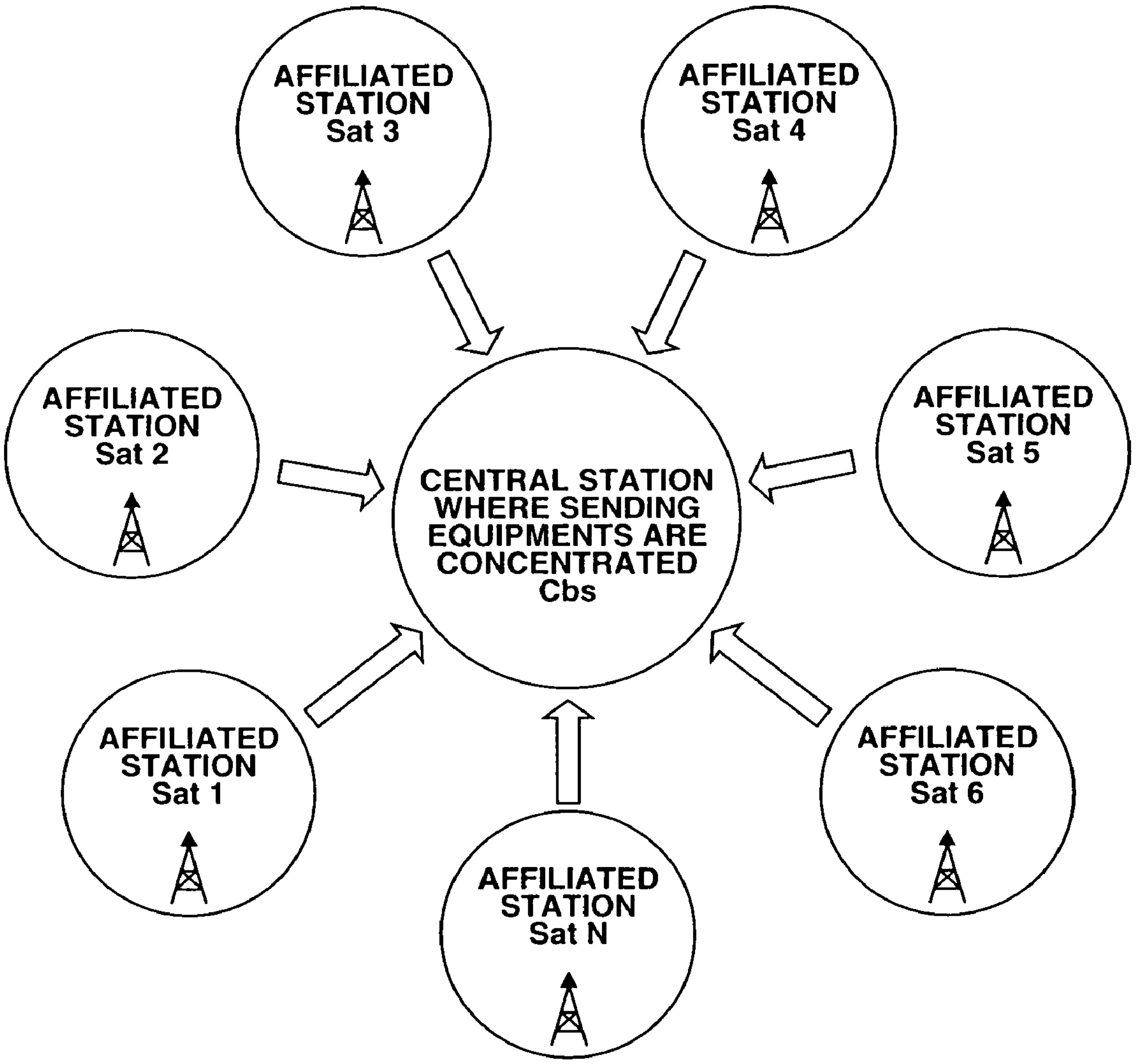
FIG. 8 is a conceptual explanatory view of central casting system proposed in this invention.

FIG. 8 is conceptual explanatory view of the central casting system proposed in this invention, and the previously described broadcasting system BDS corresponds to such system. The central casting system is a system in which individual sending equipments that respective affiliated stations SAT 1 to Sat N conventionally respectively provide are concentrated and integrated at one portion (e.g., central station Cbs) to thereby rationalize equipment, use and maintenance to carry out centralized management.

The above-mentioned ATM/LAN 50 governs registration of program material or CM material, forwarding of various commands from the N-the affiliated station SatN to the central station Cbs, forwarding of organization information from the N-th affiliated station SatN to the central station Cbs, and data transmission such as forwarding, etc. of program material or CM material which has been caused to undergo reference from the central station Cbs to the N-th affiliated station SatN. As delivery protocol, MPEG transport stream (hereinafter described as MPEG-TS) is applied.

Figure 9:
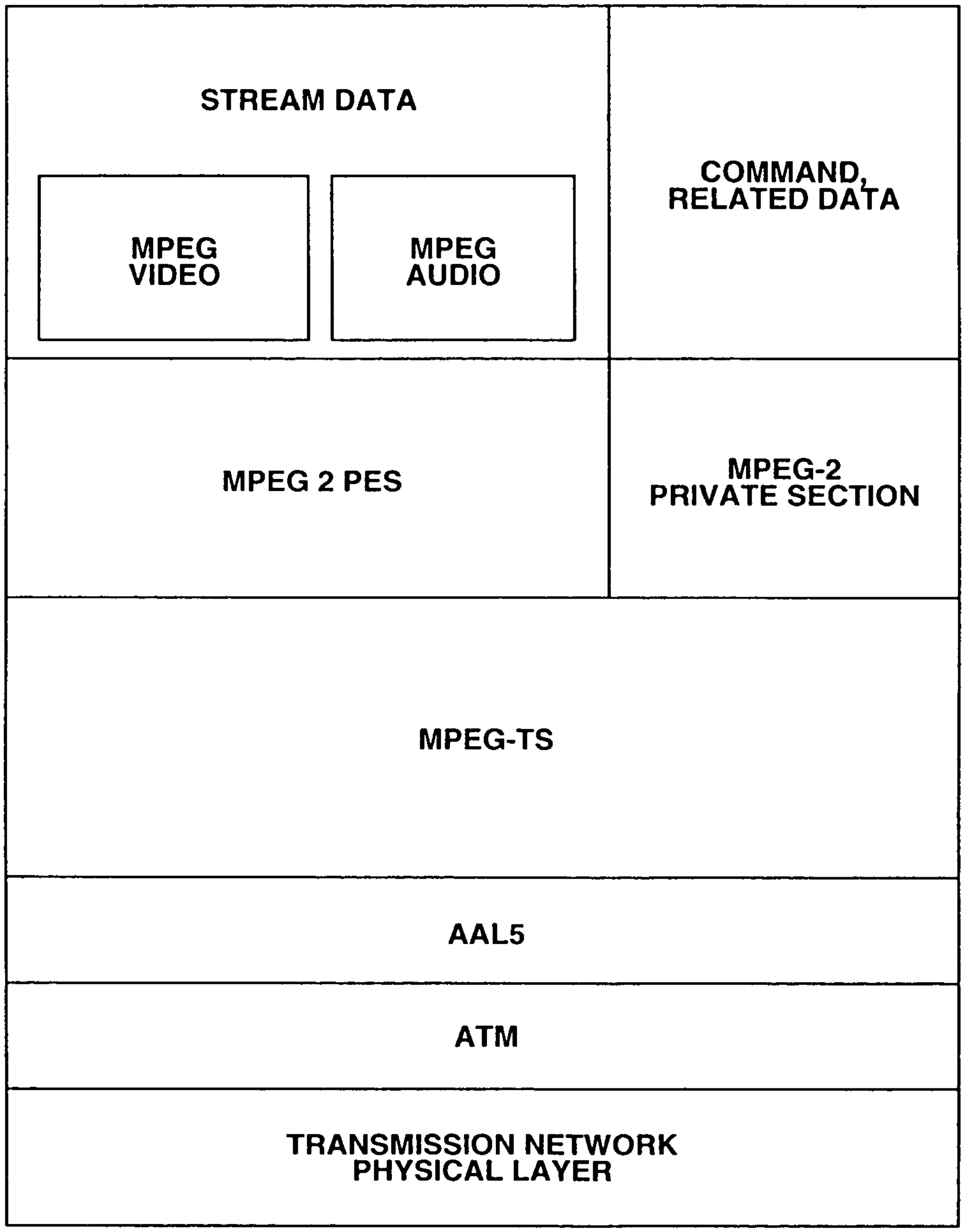
FIG. 9 is an explanatory view of layer structure of MPEG transport stream applied to the broadcasting system shown in FIG. 5.

FIG. 9 is an explanatory view of layer structure of MPEG transport stream (MPEG-TS) applied to the network shown in FIG. 5.

The MPEG-TS exists on communication network physical layer and layers of ATM, AAL5, and serves to realize various functions of synchronization of operating clocks at the transmitting side and the receiving side necessary for real time transmission of image/sound, media synchronization between image and sound, and multiplexing of plural image/sound channels, etc. As kind of information forwarded in the state mounted on MPEG-TS, there are MPEG-2 elementary stream (MPEG-2 PES) which is real time stream of image/sound and data, and MPEG-2 private section for carrying out transmission of command information or file information on non-real time basis, etc.

AAL5 (ATM adaptation layer) is one form of ATM adaptation layer for realizing transmission of variable length packet data.

As stream data by PES of MPEG-2, transmission of image of program material or CM material is carried out from the affiliated station to the key station by MPEG video, and transmission of sound of program material or CM material is carried out from the affiliated station to the key station or from the key station to the affiliated station by MPEG audio.

On the other hand, at Private Section of MPEG-2, bidirectional transmission/reception of related data including command or organization information is carried out.

FIG. 10 is a view for explaining an example or organization information file. The organization information file 2S comprises BANK/FILE column, START time column and END time column, wherein material information are filed in order of organization.

Program material PF101 of program bank Prg serving as material which is first in televising order is scheduled so that start time is 000 milliseconds 00 seconds 00 munites 12 hours and end time is 990 milliseconds 29 seconds 08 minutes 12 hours, and CM material CF606 of CM bank serving as the succeeding second material is scheduled so that start time is 000 milliseconds 30 seconds 08 minutes 12 hours and end time is 990 milliseconds 44 seconds 08 minutes 12 hours.

Similarly in the following program material PF225 of program bank Prg serving as the third material is scheduled so that start time is 000 milliseconds 45 seconds 08 minutes 12 hours, and end time is 990 milliseconds 59 seconds 19 minutes 12 hours, and CM material CF059 of CM bank serving as the forth material is scheduled so that start time is 000 milliseconds 00 seconds 20 minutes 12 hours, and end time is 990 milliseconds 14 seconds 20 minutes 12 hours. In the following, material information and time information which are organized are continued. Thus, televising contents are organized on the basis of such organization information.

Here, in replacing the second material by other material, it is sufficient to replace second material information If 606 in organization information file 2S by replacement material information If 28. Accordingly, when incorporation into televising contents of the own station is carried out by making use of material that other station registers and stores, it is sufficient to replace corresponding material information of organization information file 2S within server. Thus, it becomes possible to easily receive, from the central station Cbs, televising contents in which desired materials are incorporated.

Figure 11:
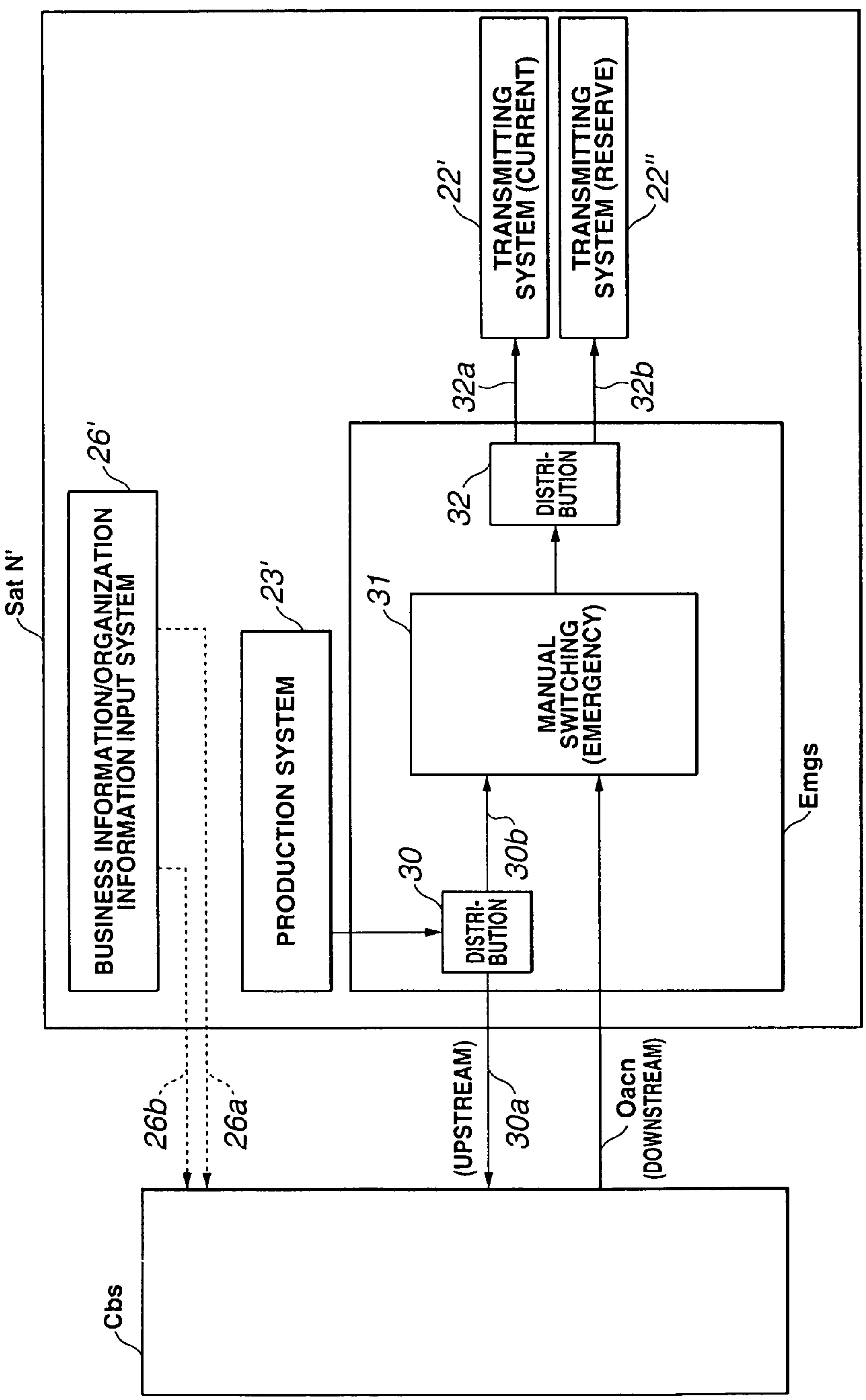
FIG. 11 is an essential part block diagram showing an example of affiliated station shown in FIG. 5.

FIG. 11 shows an essential part block configuration of affiliated station provided with emergency avoidance function. The N-th affiliated station Sat N' comprises a production system 23' for producing material, a distribution unit 30 for distributing material data delivered from the production system 23' into material data 30*a* for registration (upstream) sent toward the central station Cbs and material data 30*b* for real time sending which can be directly sent from the own station, a switching unit 31 for permitting manual switching between televising contents Oacn sent (flowing in a downstream direction) from the central station Cbs and material data 30*b* for direct sending, and a distribution unit 32 for delivering stream delivered from the switching unit 31 to a current transmitting system 22' as stream 32*a*, or for delivering it to a transmitting system 22" for reserve as stream 32*a*. The N-th affiliated station SatN' further comprises a business information/organization information input system 26'.

At the N-th affiliated station SatN', the distribution unit 30, the switching unit 31 and the distribution unit 32 constitute emergency avoidance equipment Emgs. The emergency avoidance equipment Emgs is operative so that when televising contents Oacn sent from the central station Cbs are interrupted for any reason, it carries out emergency operation, whereby the switching unit 31 switches televising contents Oacn into material data 30*b* which is real time stream for direct sending to thereby prevent interruption of broadcast.

Moreover, when current transmitting system 22' for the own station becomes inoperative for any reason, the emergency avoidance equipment Emgs allows the transmitting system 22" for reserve to be immediately operative. By the above-mentioned configuration, the N-th affiliated station SatN' permits countermeasure at the time of emergency.

The operation of the broadcasting system BDS shown in FIG. 5 will now be described. FIG. 12 is a view for explaining the operation mode of the broadcasting system BDS. The broadcasting system BDS becomes operative in the following four modes, i.e., material registration/updating mode Mod 1, registered information reference mode Mod 2, organization information registration/updating mode Mod 3, and on air mode 4.

The material registration/updating mode Mod 1 is a mode for forwarding material that affiliated station SAT produces to the central station Cbs to register that material to carry out material management at the central station Cbs.

In the material registration/updating mode Mod 1, there are a step of forwarding material and registration/updating command therefor from the affiliated station SAT to the central station Cbs, a step of allowing the central station Cbs to receive the material and the registration/updating command which have been forwarded, a step of allowing the central station Cbs to register and store or update the received material with respect to the bank, and a step of allowing the central station Cbs to update list file within the server. The operation of this material registration/updating mode 1 will be described later in detail on the basis of FIG. 13.

The registered information reference mode Mod 2 is a mode for carrying out confirmation of materials which have been stored and have been caused to undergo centralized management at the central station Cbs.

In the registered information reference mode Mod 2, there are a step of forwarding list forwarding designation command within the server from the affiliated station SAT to the central station Cbs, a step of forwarding list from the central station Cbs to the affiliated station SAT, a step of allowing the affiliated station to receive and examine the forwarded list, a step of forwarding forwarding designation command of material (e.g., CM material registered at other station, etc.) indicated in the list from the affiliated station SAT to the central station Cbs, a step of sending corresponding material from the central station Cbs to the affiliated station SAT, and a step of allowing the affiliated station SAT to receive the forwarded material to examine utilization thereof. The operation of this registered information reference mode Mod 2 will be described later in detail on the basis of FIG. 14.

The organization information registration/updating mode Mod 3 is a mode for allowing respective affiliated stations SAT to register/update, with respect to the central station Cbs, organization information for making a request for organization of televising contents for the own stations.

In the organization information registration/updating mode Mod 3, there are a step of forwarding organization information and registration/updating command therefor from the affiliated station SAT to the central station Cbs, and a step of allowing the central station Cbs to receive the organization information and the registration/updating command which have been forwarded to register and store or update them with respect to organization information file. The operation of this organization information registration/updating mode Mod 3 will be described later in detail on the basis of FIG. 15.

The on air mode Mod 4 is a mode for executing organization and sending of televising contents for respective affiliated stations based on organization information at the central station Cbs to allow the respective affiliated stations SAT to execute transmitting of televising contents.

In the on air mode Mod 4, there are a step of allowing the central station Cbs to execute organization on the basis of time keeper to send televising contents to corresponding affiliated station SAT, and a step of allowing the affiliated station SAT to receive sent televising contents to transmit them. The operation of this on air mode Mod 4 will be described later on the basis of FIG. 16.

Figure 13:
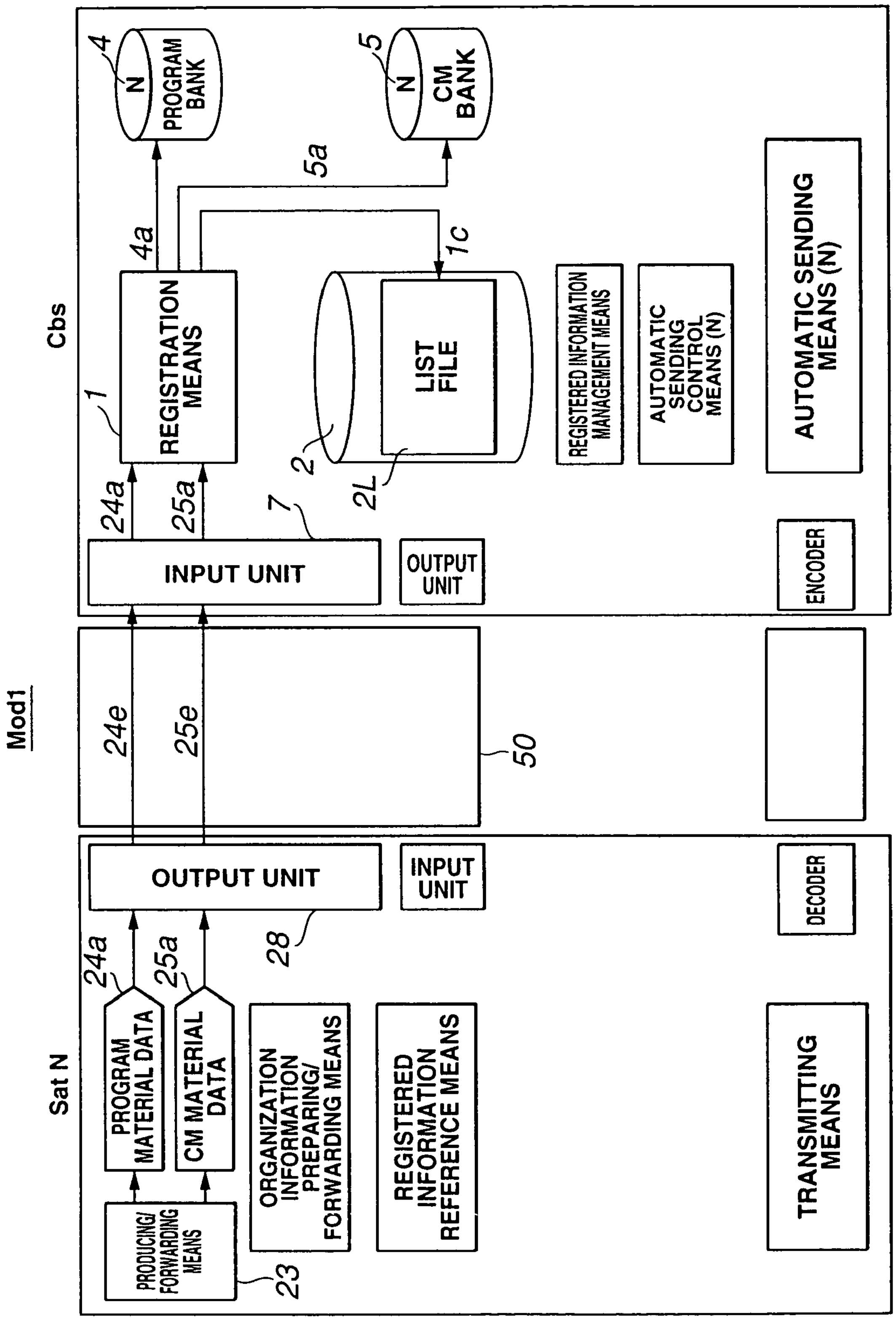
FIG. 13 is a view for explaining operation of material registration/updating mode of operation modes of the broadcasting system shown in FIG. 5.

FIG. 13 is a view for explaining the operation of material registration/updating mode Mod 1. The N-th affiliated station SatN produces program source and CM source by reproducing/forwarding means 23 thereafter to allow this program source to be program material data 24*a* to which registration/updating command therefor is attached, and to allow this CM source to be data 25*a* to which registration/updating command therefor is attached to encode such data by output unit 28 to allow these encoded data to be respectively signals 24*e*, 25*e* to forward them to the central station Cbs via ATM/LAN 50. In this example, forwarding protocol of program source and CM source is executed in conformity with MPEG-2 elementary stream of MPEG-TS (MPEG-2 PES), and forwarding protocol of registration/updating command is executed in conformity with MPEG-2 private section of MPEG-TS.

At the central station Cbs, input unit 7 decodes received signals 24*e*, 25*e* to restore original program material data 24*a* and original CM material data 25*a*, whereby when attached those registration/updating commands are confirmed, these program material data 24*a* and CM material data 25*a* are sent to registration means 1.

The registration means 1 is operative so that when this means receives program material data 24*a*, it separates this data into program material 4*a* and registration/updating command to store the program material 4*a* into program bank 4 for the N-th affiliated station on the basis of the registration/updating command to accumulate or update it, and to issue material list data 1*c* which specifies this program material 4*a* to register or update this material list data 1*c* with respect to list file 2L of data server 2.

The registration means 1 similarly separates CM material data 25*a* into CM material 5*a* and registration/updating command to store the CM material 5*a* into CM bank 5 for the N-th affiliated station on the basis of the registration/updating command to accumulate or update it, and to issue material list data 1*c* which specifies this CM material 5*a* to register or update this material list data 1*c* with respect to list file 2L of data server 2.

In a manner as described above, the program material 4*a* and the CM material 5*a* that the N-th affiliated station SatN produces are respectively stored into program bank 4 and CM bank 5 existing at the central station Cbs. Moreover, that list is caused to undergo management at list file 2L of data server 2 existing at the central station Cbs side. This similarly applies to other affiliated stations. As a result, at the central station Cbs side, all program materials and all CM materials that all affiliated stations produce are caused to undergo centralized storage so that reference can be made, and list of these all materials which have been caused to undergo centralized storage is stored so that reference can be made.

Accordingly, in accordance with such broadcasting system, material banks and preliminary banks therefor that conventional respective affiliated stations respectively have can be omitted. Thus, reduction in equipment cost and use cost can be made.

Figure 14:
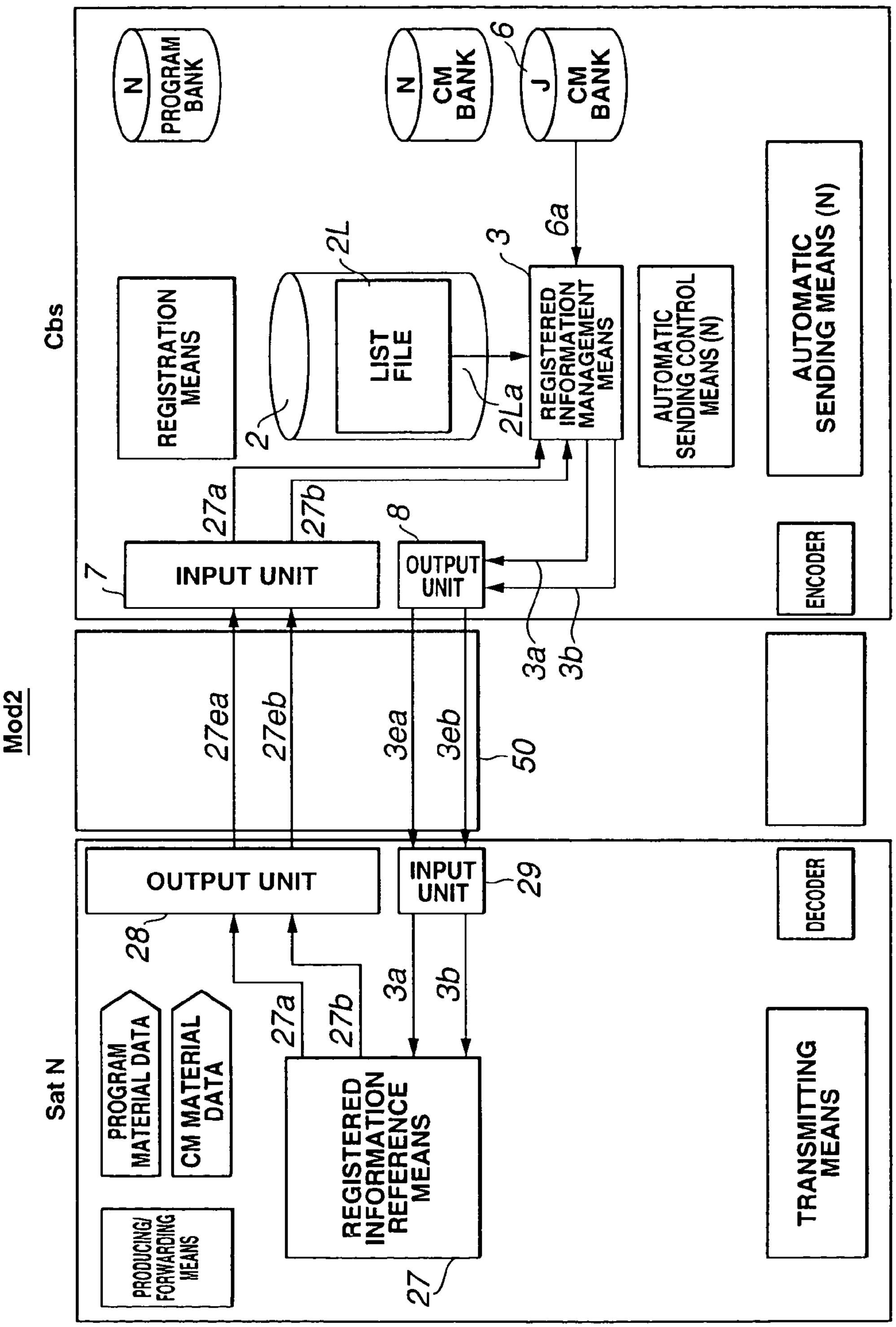
FIG. 14 is a view for explaining operation of registration information reference mode.

FIG. 14 is a view for explaining the operation of registration information reference mode Mod 2. The N-th affiliated station SatN allows registered information reference means 27 to issue designation command 27*a* which forwards list file 2L (or a portion thereof) of data server 2 existing at the central station Cbs side to encode this designation command by the output unit 28 to allow such encoded designation command to be signal 27*ea* to forward this signal 27*ea* to the central station Cbs via the ATM/LAN 50.

The central station Cbs decodes the received signal 27*ea* at the input unit 7 to restore the decoded signal into original designation command 27*a* to send the restored command to registered information management means 3. The registered information management means 3 reads out list file 2L (or a portion thereof) as list data 2La from the data server 2 on the basis of the designation command 27*a* to organize list information 3*a* in which notification information is attached thereto thereafter to encode this list information 3*a* at the output unit 8 to allow the encoded signal to be signal 3*ea* to send the signal 3*ea* to the N-th affiliated station SatN via the ATM/LAN 50. In this example, forwarding protocol of designation command or information is executed in conformity with MPEG-2 private section of MPEG-TS.

The N-th affiliated station SatN is operative so that when this station receives signal 3*ea*, it decodes the received signal 3*ea* at input unit 29 to restore the decoded signal into list information 3*a* with notification information to further second the restored list information to the registered information reference means 27 on the basis of the attached notification information. The registered information reference means 27 extracts list data 2La from the list information 3*a*. Thus, organizer of the N-th affiliated station Sat N side can examine the content of the forwarded list data 2La.

When the organizer judges that it is necessary to examine, in more detail, material indicated in the list data 2La, e.g., CM material, etc. registered at the J-th affiliated station, designation command 27*b* for forwarding this material is issued at the registered information reference means 27 to encode this designation command 27*b* at the output unit 28 to allow the encoded signal to be signal 27*eb* to forward the signal 27*eb* to the central station Cbs via the ATM/LAN 50 by the protocol in conformity with MPEG-2 private section of MPEG-TS.

The input unit 7 of the central station Cbs decodes received signal 27*eb* to restore it into original designation command 27*b* to send the original designation command to the registered information management means 3 on the basis of the content. The registered information management means 3 reads out designated CM material 6*a* from the CM bank 6 for the J-th affiliated station on the basis of the designation command 27*b* to organize material information 3*b* in which notification information is attached to the CM material 6*a* thereafter to encode this material information 3*b* at the output unit 8 to allow the encoded signal to be signal 3*eb* to forward the signal 3*eb* to the N-th affiliated station SatN via the ATM/LAN 50.

In this example, forwarding protocol of the CM material 6*a* is executed in conformity with MPEG-2 elementary stream of MPEG-TS (MPEG-2 PES), and forwarding protocol of notification information is executed in conformity with MPEG-2 private section of MPEG-TS.

When input unit 29 of the N-th afflicated station SatN receives signal 3*eb*, the input unit 29 decodes this signal 3*eb* to restore it into material information 3*b* to send the material information 3*b* to the registered information reference means 27 on the basis of attached notification information. The registered information reference means 27 extracts CM material 6 from the material information 3*b*. Thus, organizer of the N-th affiliated station SatN side can confirm the content of the CM material 6*a* registered at the J-th affiliated station which is other station, and examine utilization thereof.

Figure 15:
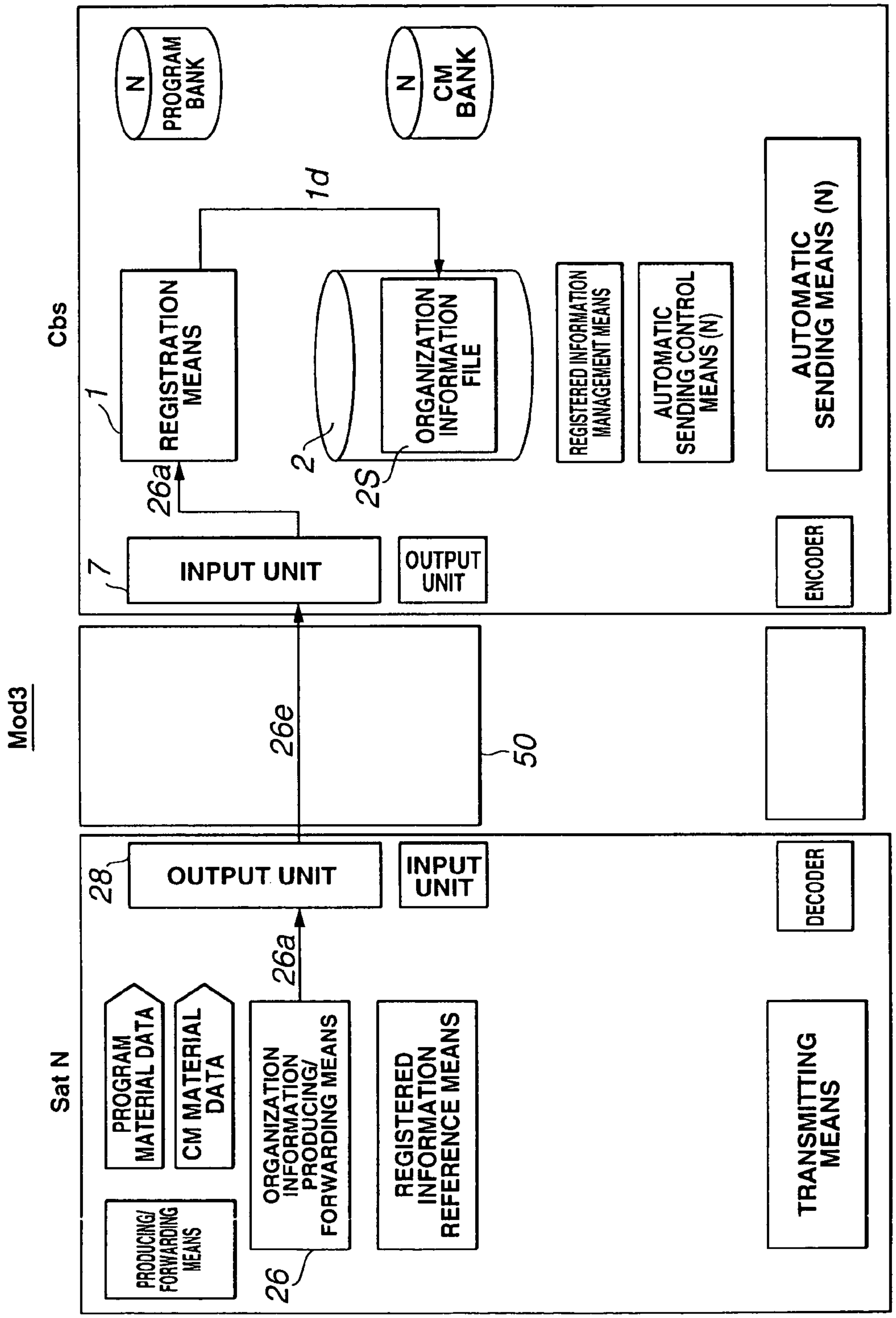
FIG. 15 is a view for explaining operation of organization information registration/updating mode.

FIG. 15 is a view for explaining the operation of organization information registration/updating mode Mod 3. The N-th afflicated station SatN is operative so that in the case where this station SatN determines organization content of televising contents of the own station, or in the case where this station SatN determines that CM material 6*a* is incorporated into televising contents of the own station (the N-th affiliated station SatN) or is replaced by such televising contents for utilization as the result of the fact that the N-th affiliated station SatN confirms the CM material 6*a* that, e.g., the J-th affiliated station which is other station registers, the N-th affiliated station SatN prepares organization information to register or update it with respect to the central station Cbs.

First, when organization information producing/forwarding means 26 of the N-th affiliated station SatN prepares organization information data 26*a* formed by organization information and registration/updating command therefor, the organization information data 26*a* is encoded at the output unit 28, and is forwarded to the central station Cbs via the ATM/LAN 50 as a signal 26*e*. In this example, the organization information data 26*a* is forwarded by the protocol in conformity with the MPEG-2 private section of MPEG-TS.

The central station Cbs decodes the signal that the input unit 7 has received to restore the decoded signal into the original organization information data 26*a* formed by the organization information and registration/updating command therefor to confirm its content to send that organization information data 26*a* to the registration means 1. The registration means 1 separates the organization information data 26*a* into organization information 1*d* and registration/updating command to register or update the organization information 1*d* with respect to organization information file 2S of the data server 2 on the basis of the registration/updating command.

Replacement material information If 28 shown in FIG. 10 is an example of organization information 1*d* for updating. By this replacement material information If 28, original material information If 606 is replaced. In a manner stated above, in this made, the above-described configuration functions as the main part of utilization means of other station material, thereby making it possible to easily register or update organization information for incorporating material that other station has sent to the central broadcasting station into televising contents for the own station.

Figure 16:
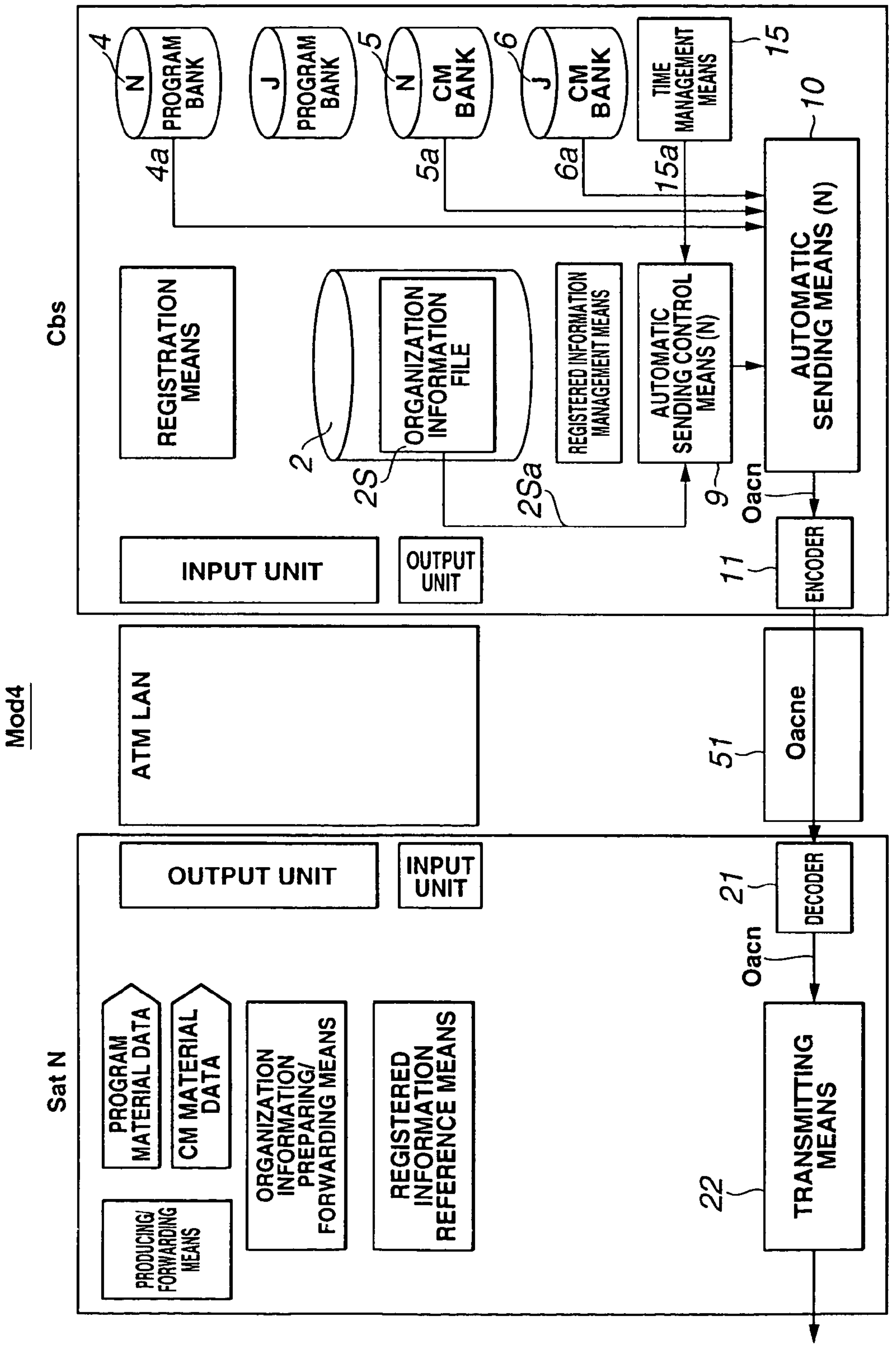
FIG. 16 is a view for explaining operation of on air mode.

FIG. 16 is a view for explaining the operation of on air mode Mod 4. Automatic sending control means 9 for the N-th affiliated station provided at the central station Cbs monitors organization information for the N-th affiliated station within organization information file 2S on the basis of time 15*a* that time management means (time keeper) 15 transmits, and to simultaneously control the operation of automatic sending means 10 for the N-th affiliated station to allow the automatic sending means 10 to execute organization of material at start times that respective material information 2Sa arranged in time series manner indicate.

The automatic sending means 10 for the N-th affiliated station suitably takes corresponding material from program bank 4 for the N-th affiliated station, CM bank 5 for the N-th affiliated station and CM bank 6 for the J-th affiliated station, etc. under control of the automatic sending control means 9 for the N-th affiliated station to prepare televising contents Oacn for the N-th affiliated station to carry out conversion into transmission signal Oacne by encoder 11 thereafter to send out the transmission signal to the N-th affiliated station SatN via dedicated digital line 51. As stated above, in this mode, the above-described configuration governs function as a portion of utilization means of other station material.

The N-th affiliated station Sat N restores the transmitted signal Oacne at a decoder 21 to transmit it as televising contents Oacn of real time from transmitting means 22 to thereby carry out broadcast.

As described above, in accordance with the broadcasting system shown as this embodiment, any switching operation of materials of respective affiliated stations in the conventional broadcasting system is not required. For this reason, even if jitter takes place during transmission, deviation in timing does not take place.

Accordingly, cut of contents and/or degradation of dignity of televising contents resulting from the fact that excessive contents remain, which were problems in the conventional broadcasting system, do not exist. Thus, televising contents can be broadcasted with high dignity.

Further, in the broadcasting system shown as this embodiment, sending equipments which were conventionally provided every affiliated stations are provided at the central station in centralized and integrated manner, and the central station is caused to be of configuration functioning as core portion of the above-mentioned central casting function, i.e., central casting station, thereby making it possible to rationalize equipments, use and maintenance.

Furthermore, in the conventional broadcasting system, preliminary systems are individually installed in addition to current sending equipments, etc. as respective affiliated stations. On the contrary, the broadcasting system shown as this embodiment is adapted to centralize and integrate systems at the central casting station to thereby reduce the number of preliminary systems to carry out rationalization so that optimized system can be provided. Moreover, it is possible to carry out, within the central casting station, management of delay quantity in the case where transmission is carried out in a form of stream signal.

Further, the broadcasting system shown as this embodiment omits marking system of complicated mechanism for marking trigger signal (net queue, etc.) which was required in the key station of the conventional broadcasting system, thereby making it possible to simplify equipment of the central station. Accordingly, it becomes possible to eliminate increase in equipment cost required for sending system of the key station side and increase in use cost including the staffs which were problems of the conventional broadcasting system.

The broadcasting system shown as this embodiment omits equipments for trigger signal detection and televising contents reorganization, etc. which were similarly required at respective affiliated stations of the conventional broadcasting system, thereby making it possible to simplify equipments of respective affiliated stations. Moreover, it becomes possible to eliminate increase in equipment cost and increase in use cost including staffs at respective affiliated stations which were problems of the conventional broadcasting system.

Further, the broadcasting system shown as this embodiment collects program materials or CM materials produced at respective affiliated stations at the central casting station to carry out management thereof to conduct switching on the basis of organization information prepared at respective affiliated stations to organize televising contents for respective affiliated stations to deliver such televising contents to respective affiliated stations. For this reason, since respective affiliated stations can organize peculiar organization information independently every stations, the central casting station is permitted to organize televising contents for own stations to receive distribution thereof. In addition, it is possible to easily incorporate program material or CM material which has been produced by other station into peculiar televising contents for own station.

The contents organizing and supplying center proposed in this invention will be described below.

Figure 17:
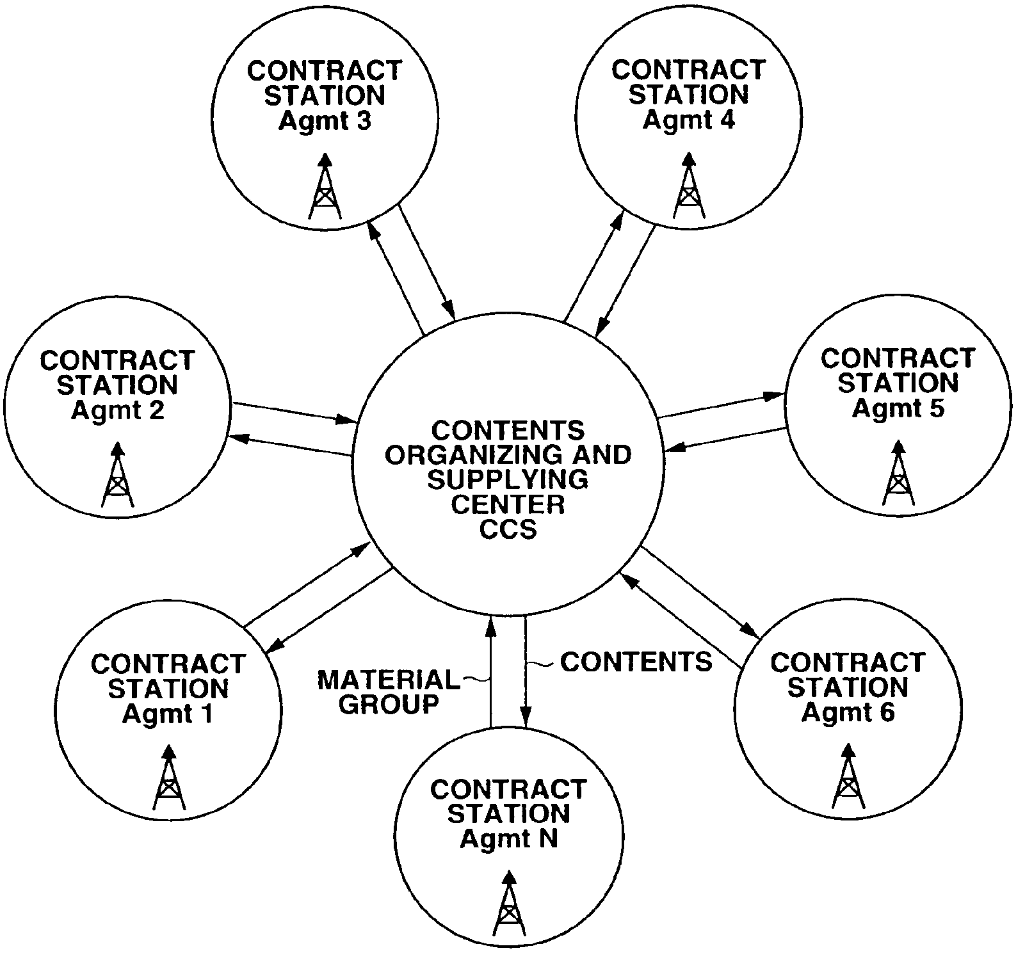
FIG. 17 is a conceptual view of a contents organizing and supplying center proposed in this invention.

While the above-described broadcasting system BDS is caused to be of configuration in which central casting station is embodied within the central station (central broadcasting station) Cbs, central casting station may be embodied as dedicated contents organizing and supplying center CCS as shown in FIG. 17 in place of the central station Cbs.

In this case, the contents organizing and supplying center CCS contracts with plural broadcasting stations (which will be called contract stations Agmt) to receive material group of program materials or CM materials, etc. produced at respective contracted stations Agmt (i:i=1 to N) and forwarded therefrom to carry out centralized management, and to carry out switching, etc. on the basis of organization information delivered from respective contract stations Agmt (i) to thereby respectively organize televising contents dedicated to respective contract stations to deliver such televising contents to respective contract stations Agmt (i). At this time, the respective contract stations Agmt (i) receive televising contents sent from the contents organizing and supplying center CCS to transmit such televising contents to viewers to thereby carry out broadcast.

The contents organizing and supplying center CCS comprises connecting means for carrying out network connection with respect to respective contract stations Agmt (i), and plural sending means for organizing plural materials in accordance with a predetermined order on the basis of materials constituted by at least one of image and sound and organization information for materials which have been forwarded from respective contract stations Agmt (i) to allow such plural materials to be televising contents for corresponding contract stations to respectively send the televising contents to corresponding contract stations Agmt (i) via the network.

As stated above, the contents organizing and supplying center CCS is a specialized center for carrying out service to organize forwarded materials in accordance with contract so that televising contents are provided to deliver such televising contents to corresponding contract stations Agmt (i). Moreover, since the contents organizing and supplying center CCS is not the broadcasting station unlike the above-described central station Cbs, it is unnecessary to have equipment that the contents organizing and supplying center itself carries out broadcast.

In the central casting station by this contents organizing and supplying center CCS, when materials and organization information for the materials are forwarded from respective contract stations Agmt (i), televising contents for respective contract stations based on materials and organization information for materials are organized by respective sending means to send such televising contents to corresponding contract stations Agmt (i) via the network. Respective contract stations Agmt (i) which have such televising contents transmit them toward viewers. Thus, broadcast is carried out.

Accordingly, at the contents organizing and supplying center CCS side, necessity of notification of timings used for organization and sending of televising contents at respective contract stations Agmt (i) is eliminated. Thus, means and processing according to timing notification can be omitted.

On the contrary, at the respective contract stations Agmt (i) side, means and processing according to organization and sending of televising contents can be omitted. Other functions and merits/advantages are the same as those of the previously described central station Cbs.

Figure 18:
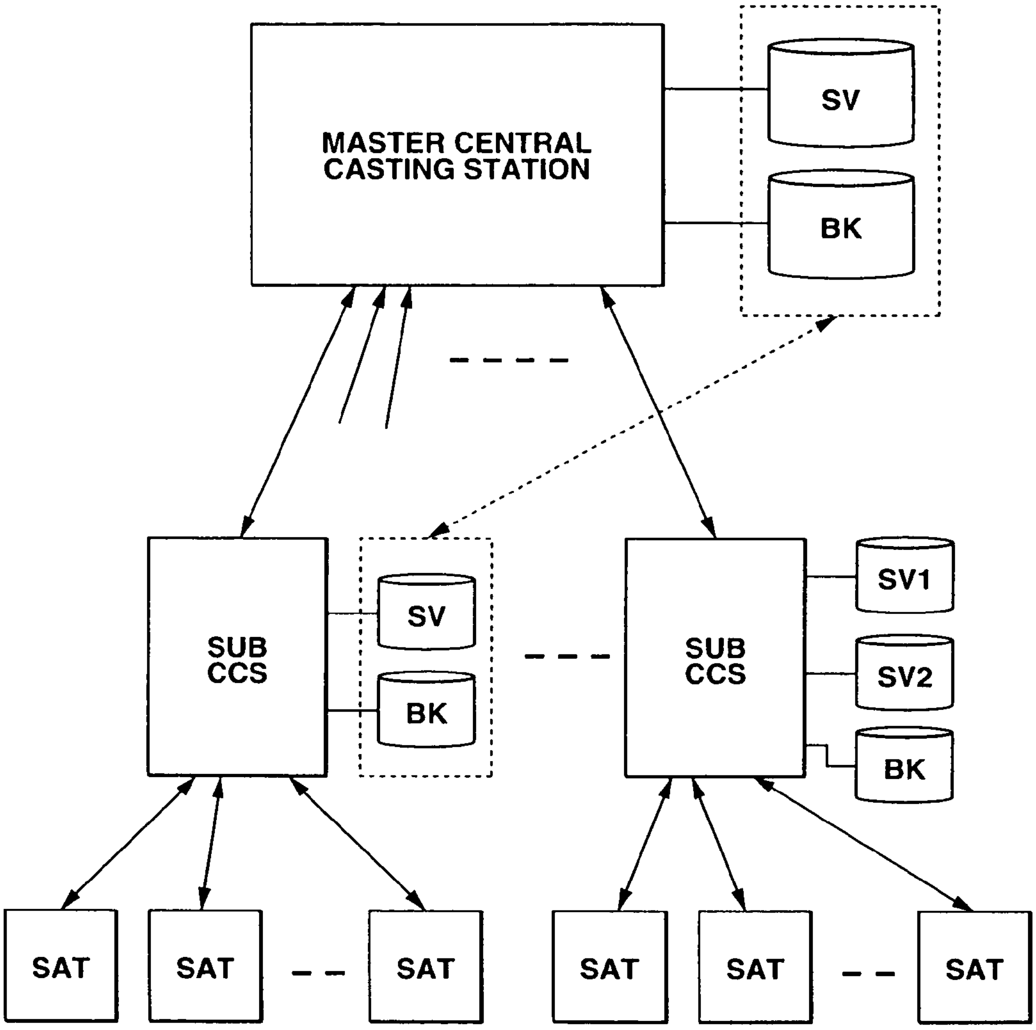
FIG. 18 is a block diagram of a contents organizing and supplying center having hierarchical structure.

FIG. 18 is a block diagram of central casting station by the hierarchical structure. The central casting station shown in FIG. 18 can be applied to both the above-mentioned central station Cbs and the contents organizing and supplying center CCS. For convenience, explanation will be given by taking the affiliated station SAT as an example.

In the case where a large number of affiliated stations SAT are included over broad area in a large scale system in which there are a large number of affiliated stations SAT or contracting broadcasting stations Agmt, etc., there takes place necessity of processing of a large number of televising contents sent from the central casting station. In this case, for the purpose of improving system efficiency, it is advantageous that the central casting station is caused to be of hierarchy.

As shown in FIG. 18, in this example, the master central casting station has general control function, and plural sub central casting stations mainly carry out management and general control of content of server or bank in place of storing video/audio data of individual materials at server or bank therefor.

Respective sub central casting stations respectively store program materials, CM materials and organization information which have been forwarded from plural affiliated stations SAT existing in these areas into banks BK or servers SV to organize televising contents toward respective affiliated stations SAT to send them. In this way, the number of transmission lines which connect sub central casting stations and respective affiliated stations SAT is permitted to be suitable number.

Further, in FIG. 18, there may be employed a configuration such that server or bank of the master central station and servers or banks of the sub central casting stations are caused to be of mirror ring. In this case, by the mirror ring, there may be realized a configuration such that the master central casting station carries out back-up of sub central casting station at the time of emergency, or a configuration contrary thereto. Thus, the system reliability can be further improved.

INDUSTRIAL APPLICABILITY

In the broadcasting method according to this invention, respective affiliated stations forward materials and organization information for the materials to the central broadcasting station at the forwarding step. Televising contents for respective affiliated broadcasting stations are organized on the basis of these materials and organization information for the materials to send such televising contents to respective affiliated broadcasting stations via network at the sending step. Then, sent respective televising contents are broadcasted toward viewers at the transmitting step. Thus, organization step and sending step of televising contents at respective affiliated broadcasting stations can be omitted.

Moreover, at the central broadcasting station, step for adding notification of timings used for organization and sending at respective affiliated broadcasting stations can be omitted. Thus, equipments and staffs at the central broadcasting station and respective affiliated broadcasting stations can be rationalized.

Further, in accordance with the broadcasting method according to this invention, since switching step for reorganizing televising contents, etc. can be omitted at the affiliated broadcasting station, cut or residual of unnecessary portion of televising contents which takes place by timing deviation can be excluded. Thus, quality of broadcast content can be maintained to be high.

The broadcasting method according to this invention comprises information management step of allowing the central broadcasting station to store materials or organization information forwarded from respective affiliated broadcasting stations so that reference can be made, and information reference step of permitting reference of stored content from arbitrary affiliated broadcasting station, thereby making it possible to produce televising contents for respective affiliated broadcasting stations by using materials obtained by reference at the central broadcasting station. Moreover, arbitrary other broadcasting station can also examine content by making reference to materials that stations except for the own station prepare.

Further, in the broadcasting method according to this invention, since organization information of materials forwarded from respective affiliated broadcasting stations are stored at the central broadcasting station, the central broadcasting station makes reference to this organization information later, thereby making it possible to execute sending step. Further, since the affiliated broadcasting station can confirm whether the content is true or wrong by making reference to stored organization information, it is possible to obtain reasonable televising contents based on reasonable organization information from the central broadcasting station.

Moreover, in the broadcasting method according to this invention, since such an approach is employed to organize televising contents for the own station at the sending step in the central broadcasting station to send such televising contents to the transmitting means for the own station, not only televising contents for respective affiliated stations are organized and are sent, but also televising contents are offered to jurisdiction area of the central broadcasting station at the central broadcasting station.

Further, in the broadcasting method according to this invention, since there is provided utilization step for other station material for incorporating material that other station has forwarded to the central broadcasting station as at least a portion of televising contents for the own station, the affiliated broadcasting station or the central broadcasting station can easily incorporate the material that other station has forwarded to the central broadcasting station as a portion of televising contents for the own station.

Further, in the broadcasting system according to this invention, forwarding means of respective affiliated broadcasting stations forward materials and organization information for the materials to the central broadcasting station, and sending means at the central broadcasting station organizes televising contents for respective affiliated broadcasting stations on the basis of these materials and organization information for the materials to respectively send such televising contents to corresponding affiliated broadcasting stations via the network. The transmitting means of respective affiliated broadcasting stations which have received televising contents transmit such televising contents toward viewers to carry out broadcast. Thus, means and processing necessary for organization and sending of televising contents at respective affiliated broadcasting stations can be omitted. On the other hand, at the central broadcasting station, means and processing for adding notification of timings used for organization and sending at respective affiliated broadcasting stations can be omitted.

Moreover, in the broadcasting system according to this invention, the central station is provided with information management means and respective affiliated broadcasting stations are provided with information reference means. Thus, materials or organization information which have been forwarded from respective affiliated broadcasting stations are stored at the central broadcasting station so that reference can be made, and reference to stored contents can be made from arbitrary affiliated station. Accordingly, the central broadcasting station can produce televising contents for respective affiliated broadcasting stations by using materials obtained by reference. Moreover, arbitrary other broadcasting station can examine the content by making reference to material that station except for the own station has prepared.

Further, since organization information for materials forwarded from respective affiliated stations are stored at the central broadcasting station, sending means of the central broadcasting station can execute processing by making reference to this organization information later. Further, corresponding affiliated broadcasting station can confirm whether the content is true or wrong by making reference to the stored organization information to obtain reasonable televising contents from the central broadcasting station on the basis of reasonable organization information.

Further, in the broadcasting system according to this invention, the central broadcasting station comprises sending means for organizing televising contents for the own station to send such televising contents to transmitting means for the own station, and transmitting means for receiving the televising contents to transmit them. Thus, the central broadcasting station not only performs the function to organize televising contents for respective affiliated stations to send them, but also can broadcast televising contents with respect to jurisdiction area of the central broadcasting station.

Further, in the broadcasting system according to this invention, the affiliated broadcasting station or the central broadcasting station comprises utilization means for other station material which can incorporate material that other station has forwarded to the central broadcasting station into televising contents for the own station, thereby making it possible to easily incorporate material that other station has forwarded to the central broadcasting station into televising contents for the own station.

In addition, the contents organizing and supplying center according to this invention is operative so that when materials and organization information for the materials are forwarded from respective broadcasting stations, respective sending means organize televising contents for respective broadcasting stations on the basis of materials and organization information for the materials to respectively send such televising contents to corresponding broadcasting stations via the network. Respective broadcasting stations which have received such televising contents transmit them toward viewers to carry out broadcast. Accordingly, at the contents organizing and supplying center side, necessity of notification of timings used for organization and sending of televising contents at respective broadcasting stations is eliminated. Thus, means and processing according to timing notification can be omitted. On the other hand, at the respective broadcasting station side, means and processing according to organization and sending of televising contents can be omitted.

The invention claimed is:

1. A broadcasting method for a broadcasting system in which a central broadcasting station and plural affiliated broadcasting stations are connected through a network, and one or more of the affiliated broadcasting stations transmit plural materials including at least one of image and sound to viewers as television content organized in a predetermined order to televise the materials, the broadcasting method comprising:

a forwarding step of forwarding, by each of the affiliated broadcasting stations, unorganized program materials attached with registration command, commercial material attached with the registration command, and organization information for the unorganized program materials to the central broadcasting station, wherein the program and commercial materials are produced and edited by each of the affiliated broadcasting stations;

a separating step of separating for each respective affiliated broadcasting station, at the central broadcasting station, (a) the unorganized program materials attached with the registration command into the registration command and unorganized program material, and (b) the commercial material attached with the registration command into the registration command and commercial material;

a processing step of organizing, at the central broadcasting station, the unorganized program material as television content for each respective affiliated broadcasting station according to the commands separated from the unorganized program materials and organization information for each affiliated broadcasting station;

a sending step of sending respective organized television content to each respective affiliated broadcasting stations via the network according to destination information included in the registration command, wherein the central broadcasting station organizes the respective television content for each respective affiliated broadcasting station based on the program material, commercial material, and organization information for the material independent of timing notification;

a receiving step in which one or more selected affiliated broadcasting stations receives the television content which was transmitted by the central broadcasting station via the network; and transmitting, by the affiliated broadcasting stations, the received television content to the viewers.

2. The broadcasting method as set forth in claim 1, further comprising:

a storing step of storing, at the central broadcasting system, at least one of the materials and organization information for the materials which have been forwarded from the respective affiliated broadcasting stations at the central broadcasting station so that reference can be made; and a requesting step of requesting reference of the stored content to the central broadcasting station to allow the central broadcasting station to accept the reference request to forward the corresponding stored content to one or more particular affiliated broadcasting stations to allow the one or more particular affiliated broadcasting stations to receive the forwarded stored content.

3. The broadcasting method as set forth in claim 1, further comprising:

a sending step of sending television content to a transmitting unit for one or more of the plural affiliated broadcasting stations , the television content having been organized by the central broadcasting station;

a transmitting step of transmitting the television content;

a sending step of allowing the central broadcasting station to organize television content for a specific one of the plural affiliated broadcasting stations to send such television content to transmitting means for the specific affiliated broadcasting station; and a transmitting step of transmit transmitting the television content from the central broadcasting station to the specific affiliated broadcasting station.

4. The broadcasting method as set forth in claim 1, further comprising:

an incorporation step for incorporating material that another station has forwarded to the central broadcasting station into at least a portion of the television content of at least any one of the affiliated broadcasting stations and the central broadcasting station.

5. A broadcasting system in which a central broadcasting station and plural affiliated broadcasting stations are connected through a network, and the respective broadcasting stations transmit plural materials constituted by at least one of image and sound to viewers as television content in which they are organized in accordance with a predetermined order to televise such television content, wherein the plural affiliated broadcasting stations each comprise:

forwarding means for forwarding unorganized program materials attached with registration command, commercial material attached with the registration command, and organization information for the unorganized program materials to the central broadcasting station, wherein the program and commercial materials are produced and edited by the respective affiliated broadcasting station;

receiving means in which one of the affiliated broadcasting stations receives respective television content associated with the one affiliated broadcasting station which was transmitted by the central broadcasting station via the network;

transmitting means for transmitting the received television content to the viewers, the central broadcasting station comprises:

organizing means for organizing respective television content for each of the affiliated broadcasting stations on the basis of the unorganized program materials and organization information for the unorganized materials forward to the central broadcasting station by each affiliated broadcasting station so that the respective television content can be sent, independent of a timing notification, to each respective affiliated broadcasting via the network according to destination information included in the registration command;

separating means for separating for each respective affiliated broadcasting station, at the central broadcasting station, (a) the unorganized program materials attached with the registration command into the registration command and unorganized program material, and (b) the commercial material attached with the registration command into the registration command and commercial material; and sending means for sending, at the central broadcasting station, the respective television content for each respective affiliated broadcasting station according to the commands separated from the unorganized program materials from each affiliated broadcasting station.

6. The broadcasting system as set forth in claim 5, wherein the central broadcasting station comprises:

information management means for managing information, the information management means storing at least one of the materials and organization information for the materials which have been forwarded from one or more affiliated broadcasting stations so that reference can be made, and accepting a reference request of the stored content from an arbitrary one of the affiliated broadcasting stations so that the corresponding stored content can be forwarded to the particular affiliated broadcasting station, wherein the affiliated broadcasting station comprises information reference means for requesting the central broadcasting station to make reference to the stored content so that the affiliated broadcasting station can receive the forwarded stored content.

7. The broadcasting system as set forth in claim 5, wherein the central broadcasting station comprises:

organizing means for organizing television content sent to the one or more particular stations so that television content can be transmitted to the one or more particular stations; and wherein the transmitting means receives the television content to transmit the television content.

8. The broadcasting system as set forth in claim 5, wherein at least one of the affiliated broadcasting station and the central broadcasting station comprises utilization means for incorporating material that another station has forwarded to the central broadcasting station into at least a portion of television content for the associated station.

* * * * *